(12) United States Patent
Visharam et al.

(10) Patent No.: US 7,613,727 B2
(45) Date of Patent: Nov. 3, 2009

(54) METHOD AND APPARATUS FOR SUPPORTING ADVANCED CODING FORMATS IN MEDIA FILES

(75) Inventors: Mohammed Zubair Visharam, Santa Clara, CA (US); Ali Tabatabai, Beaverton, OR (US); Toby Walker, Seattle, WA (US)

(73) Assignees: Sont Corporation, Tokyo (JP); Sont Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/371,434

(22) Filed: Feb. 21, 2003

(65) Prior Publication Data

US 2003/0163781 A1 Aug. 28, 2003

Related U.S. Application Data

(63) Continuation of application No. 10/371,464, filed on Feb. 21, 2003, now abandoned.

(51) Int. Cl.
*G06F 17/30* (2006.01)

(52) U.S. Cl. .................... 707/104.1; 707/101; 707/102; 707/3; 707/205

(58) Field of Classification Search ............ 707/1, 707/3, 100, 104.1, 101; 369/53.2; 370/465; 386/104, 126, 46
See application file for complete search history.

(56) References Cited

U.S. PATENT DOCUMENTS

| | | | |
|---|---|---|---|
| 5,802,063 A | 9/1998 | Deiss | |
| 5,832,472 A | 11/1998 | Sheppard, II | |
| 5,864,682 A * | 1/1999 | Porter et al. | 709/247 |
| 6,044,397 A | 3/2000 | Eleftheriadis et al. | |
| 6,079,566 A | 6/2000 | Eleftheriadis et al. | |
| 6,092,107 A | 7/2000 | Eleftheriadis et al. | |
| 6,134,243 A * | 10/2000 | Jones et al. | 370/465 |
| 6,181,822 B1 * | 1/2001 | Miller et al. | 382/232 |
| 6,215,746 B1 * | 4/2001 | Ando et al. | 369/53.2 |
| 6,292,805 B1 | 9/2001 | Basso et al. | |
| 6,317,462 B1 | 11/2001 | Boyce | |
| 6,327,304 B1 * | 12/2001 | Miller et al. | 375/240.12 |
| 6,353,703 B1 * | 3/2002 | Tatsumi et al. | 386/104 |
| 6,400,996 B1 | 6/2002 | Hoffberg et al. | |
| 6,426,778 B1 | 7/2002 | Valdez, Jr. | |
| 6,453,355 B1 | 9/2002 | Jones et al. | |
| 6,546,195 B2 * | 4/2003 | Kashiwagi et al. | 386/126 |
| 6,574,378 B1 | 6/2003 | Lim | |
| 6,920,175 B2 * | 7/2005 | Karczewicz et al. | 375/240.03 |
| 2004/0024898 A1 | 2/2004 | Wan | |

OTHER PUBLICATIONS

Marta Karczewicz (or hereinafter "Karczewicz"), A proposal for SP-frames, Apr. 1, 2001, pp. 1-9.*

(Continued)

*Primary Examiner*—Cam Y T Truong
(74) *Attorney, Agent, or Firm*—Blakely, Sokoloff, Taylor & Zafman LLP

(57) ABSTRACT

Switch sample metadata defining switch sample sets associated with multimedia data is created. Each switch sample set includes samples that have identical decoding values. Further, a file associated with the multimedia data is formed. This file includes the switch sample metadata, as well as other information pertaining to the multimedia data.

24 Claims, 44 Drawing Sheets

OTHER PUBLICATIONS

PCT Search Report dated Nov. 25, 2003, 5 pages.
Hannuksela, M., "Enhanced Concept of GOP," ISO/IEC JTC1/SC29/WG11 and ITU SG16 Q.6, Jan. 23, 2002, 13 pages.
Singer, D., et al., "ISO Media File Format Specification" ISO/IEC/JTC1/SC29/WG11 (N4270-1), Jul. 23, 2001, 49 pages.
Singer, D., et al., "Amendment 6: MP4, The MPEG File Format," ISO/IEC/JTC1/SC29/WG11 MPEG01/N4420, Dec. 27, 2001, 12 pages.
Stockhammer, T., et al., "Comments on H.26L NAL Design," ITU-Telecommunications Standardization Sector, Study Group 16, Question 6, Video Coding Experts Group (VCEG), Printed May 22, 2003, 4 pages.
Stockhammer, T., et al., "H.26L/JVT Coding Network Abstraction Layer And IP-Based Transport," IEEE 2002 International Conference on Image Processing, Rochester New York, Sep. 22-25, 2002, Available: http://www.Int.e-technik.tu-muenchen.de/mitarbeiter/stockhammer/publications/icip2002_5.pdf, 4 pages.
Walker, T., et al., "First Ideas On The Storage of AVC Content in MP4," International Standard ISO/IEC, May 2002, pp. 1-39.
Walker, T., et al., "Generic Adaptation Layer For JVT Video," Joint Video Team (AVC) of ISO/IEC MPEG & ITU-T VCEG, (ISO/IEC JTC1/SC29/WG11 and ITU-T SG16, Q6), 3$^{rd}$ Meeting, Fairfax, VA May 6-10, 2002, 23 pages.
Wenger, S., et al., "H.26L Over IP And H.324 Framework," ITU Telecommunications Standardization Sector VCEG-N52, Sep. 18, 2001, 13 pages.
Wenger, S., et al., "RTP Payload Format For JVT Video," Retrieved from http://www.cs.columbia.edu/{hgs/rtp/drafts/draft-wenger-avt-rtp-jvt-00.t>, Feb. 21, 2002, 13 pages.
Wiegand, T., "Joint Model No. 1, Revision 1(JM-IRL)," ITU Study Group 16-Video Coding Experts Group, Dec. 3, 2001, pp. 1 and 3-75.
PCT Search Report PCT/US03/05630 dated Jul. 10, 2003, 8 pages.
PCT Search Report PCT/US03/05636 dated Jul. 10, 2003, 7 pages.
PCT Search Report PCT/US03/05633 dated Jul. 10, 2003, 7 pages.
PCT Search Report PCT/US03/05634 dated Jul. 10, 2003, 7 pages.
PCT Search Report PCT/US03/13145 dated Jul. 22, 2003, 5 pages.
Hannuksela, M., "H.26L File Format," ITU Telecommunications Standardization Sector VCEG-044, Nov. 28, 2001, 20 pages.
Stockhammer, T., "H.26L/JVT Coding Network Abstraction Layer And IP-Based Transport," 2002 International Conference On Image Processing, 4 pages.
Singer, Belknap, Franceschini, Amendment 6: MP4, the MPEG-4 File Format, Dec. 7, 2001, Apple Computer Inc., IBM Corporation, CSELT.
Wenger, Stockhammer, J.26L over IP and H.324 Framework, Sep. 18, 2001.
Wenger, Cote, Gallant, Proposed Draft of Modified Annex L Including Copyright, Normative Error Concealment, and Exact IDCT Signaling, Oct. 22, 1999.
Wiegand, Join Model No. 1, Revision 1 (JM-1r1), Jan. 18, 2002.
DVD Demystified, Home of the DVD FAQ, http:www.dvddemystified.com/glossary.html, pp. 1-33.

* cited by examiner

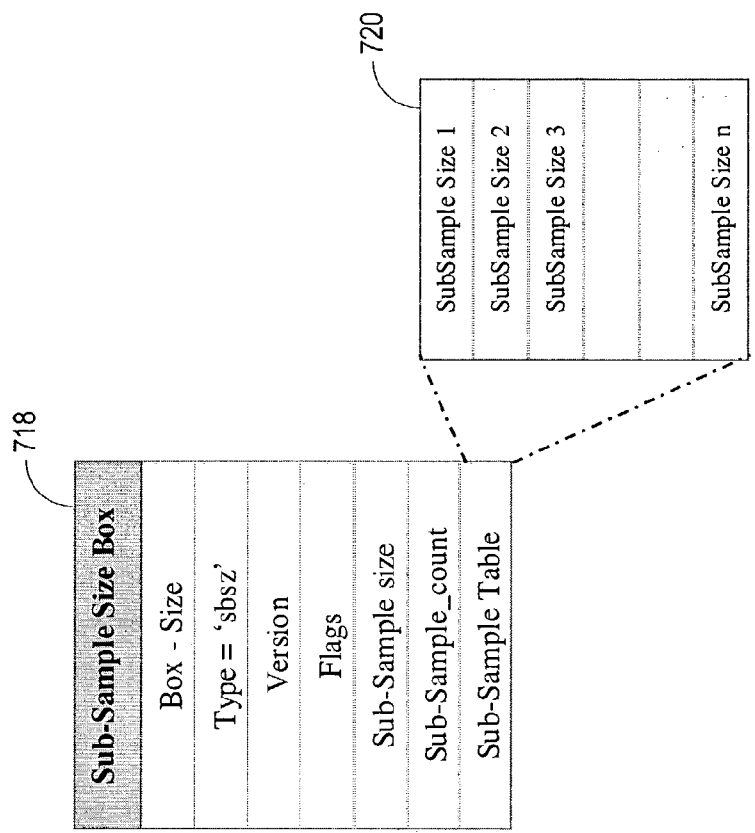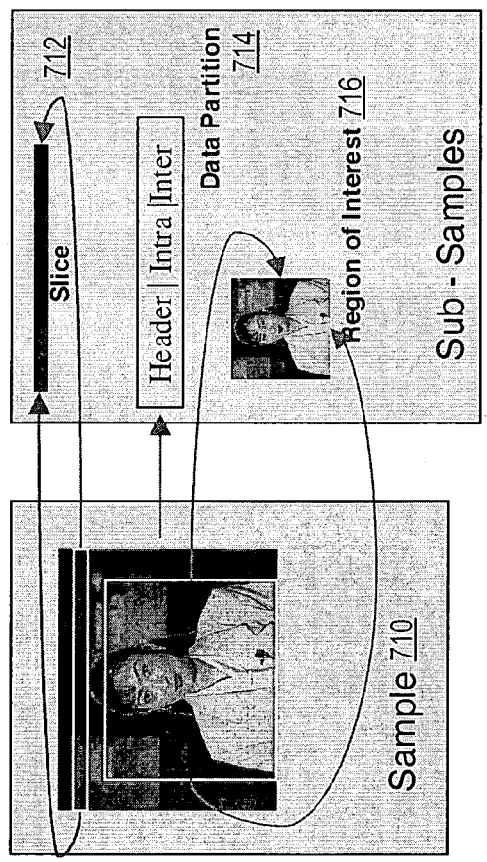
FIG. 7B

FIG. 7I

Uncompressed Table (726)

| First Sub-Sample | Sub-Sample Desc ID |
|---|---|
| 1 | ........ 0000 0000 |
| 19 | ........ 0000 1110 |
| 37 | ........ 0001 0010 |
| 38 | ........ 1000 0000 |
| 39 | ........ 0000 0010 |
| 40 | ........ 0000 0100 |
| 41 | ........ 0000 1000 |
| 42 | ........ 0000 0010 |
| 43 | ........ 0000 0100 |
| 44 | ........ 0000 1000 |
| ... | ... |

(748, 750 mark the repeated sequences)

Compressed with sequence repetition (746)

| First Sub-Sample | Sub-Sample Desc ID |
|---|---|
| 1 | ........ 0000 0000 |
| 19 | ........ 0000 1110 |
| 37 | ........ 0001 0010 |
| 38 | ........ 1000 0000 |
| 39 | ........ 0000 0010 |
| 41 | ........ 0000 0100 |
| 41 | ........ 0000 1000 |
| 42 | Refers to |
| ... | |

(748 refers to the boxed repeated entries)

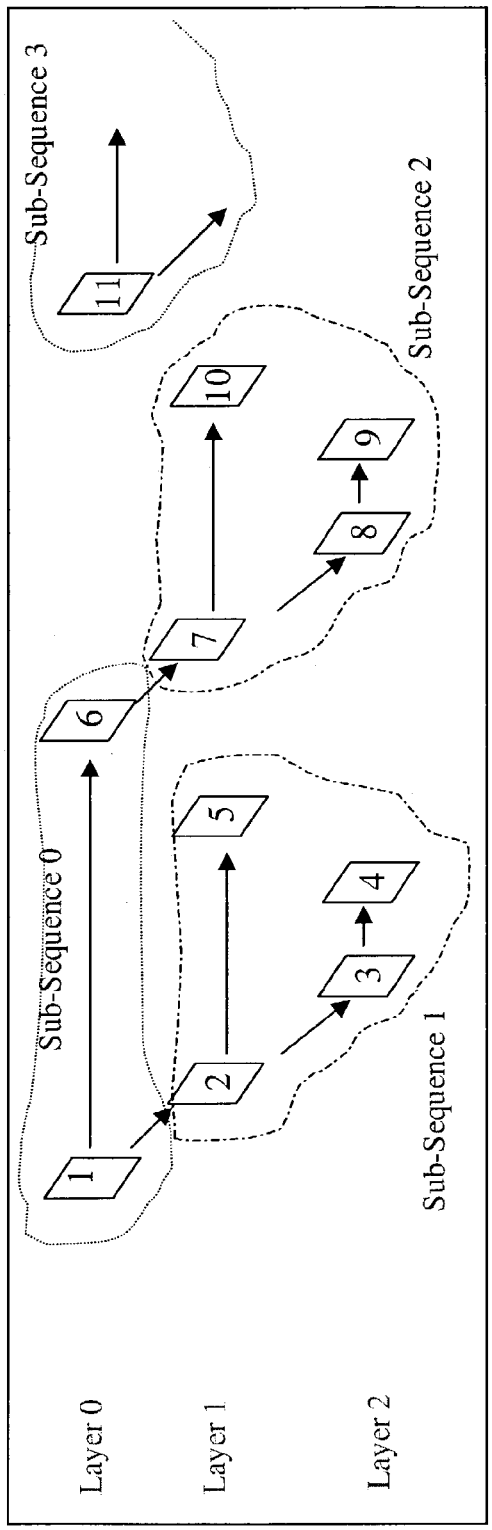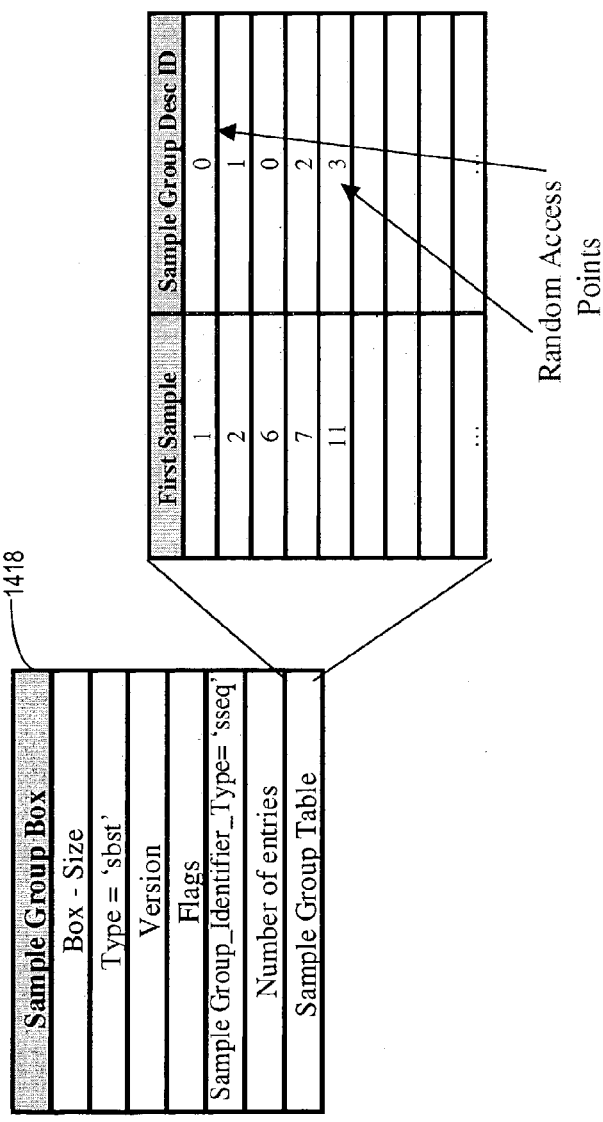
FIG. 14E

| Switch Sample | Switch Sample Track | Reference Track | Reference Samples |
|---|---|---|---|
| $S_2$ | 2 | 2 | $P_{22}$ |
| $S_{12}$ | xxx | 1 | $P_{12}$ |

Switch Sample Set 1502

FIG. 15B

| Switch Sample | Switch Sample Track | Reference Track | Reference Samples |
|---|---|---|---|
| $S_2$ | 1 | 1 | $P_{22}$ |
| $S_{12}$ | xxx | 1 | N/A |

Switch Sample Set 1902

FIG. 19B

| Switch Sample | Switch Sample Track | Reference Track | Reference Samples |
|---|---|---|---|
| $S_2$ | 1 | 1 | $P_4$ |
| $S_{12}$ | xx | 1 | $S_1$ |
| $SI_2$ | xxx | 1 | NONE |

Switch Sample Set 2002

FIG. 20B

METHOD AND APPARATUS FOR SUPPORTING ADVANCED CODING FORMATS IN MEDIA FILES

RELATED APPLICATIONS

This is a continuation of application Ser. No. 10/371,464, filed on Feb. 21, 2003, which is now abandoned.

FIELD OF THE INVENTION

The invention relates generally to the storage and retrieval of audiovisual content in a multimedia file format and particularly to file formats compatible with the ISO media file format.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Sony Electronics, Inc., All Rights Reserved.

BACKGROUND OF THE INVENTION

In the wake of rapidly increasing demand for network, multimedia, database and other digital capacity, many multimedia coding and storage schemes have evolved. One of the well known file formats for encoding and storing audiovisual data is the QuickTime® file format developed by Apple Computer Inc. The QuickTime file format was used as the starting point for creating the International Organization for Standardization (ISO) Multimedia file format, ISO/IEC 14496-12, Information Technology—Coding of audio-visual objects—Part 12: ISO Media File Format (also known as the ISO file format), which was, in turn, used as a template for two standard file formats: (1) For an MPEG-4 file format developed by the Moving Picture Experts Group, known as MP4 (ISO/IEC 14496-14, Information Technology—Coding of audio-visual objects—Part 14: MP4 File Format); and (2) a file format for JPEG 2000 (ISO/IEC 15444-1), developed by Joint Photographic Experts Group (JPEG).

The ISO media file format is composed of object-oriented structures referred to as boxes (also referred to as atoms or objects). The two important top-level boxes contain either media data or metadata. Most boxes describe a hierarchy of metadata providing declarative, structural and temporal information about the actual media data. This collection of boxes is contained in a box known as the movie box. The media data itself may be located in media data boxes or externally. Each media data stream is called a track (also known as an elementary stream or simply a stream).

The primary metadata is the movie object. The movie box includes track boxes, which describe temporally presented media data. The media data for a track can be of various types (e.g., video data, audio data, binary format screen representations (BIFS), etc.). Each track is further divided into samples (also known as access units or pictures). A sample represents a unit of media data at a particular time point. Sample metadata is contained in a set of sample boxes. Each track box contains a sample table box metadata box, which contains boxes that provide the time for each sample, its size in bytes, and its location (external or internal to the file) for its media data, and so forth. A sample is the smallest data entity which can represent timing, location, and other metadata information.

Recently, MPEG's video group and Video Coding Experts Group (VCEG) of International Telecommunication Union (ITU) began working together as a Joint Video Team (JVT) to develop a new video coding/decoding (codec) standard referred to as ITU Recommendation H.264 or MPEG-4-Part 10, Advanced Video Codec (AVC) or JVT codec. These terms, and their abbreviations such as H.264, JVT, and AVC are used interchangeably here.

The JVT codec design distinguished between two different conceptual layers, the Video Coding Layer (VCL), and the Network Abstraction Layer (NAL). The VCL contains the coding related parts of the codec, such as motion compensation, transform coding of coefficients, and entropy coding. The output of the VCL is slices, each of which contains a series of macroblocks and associated header information. The NAL abstracts the VCL from the details of the transport layer used to carry the VCL data. It defines a generic and transport independent representation for information above the level of the slice. The NAL defines the interface between the video codec itself and the outside world. Internally, the NAL uses NAL packets. A NAL packet includes a type field indicating the type of the payload plus a set of bits in the payload. The data within a single slice can be divided further into different data partitions.

In many existing video coding formats, the coded stream data includes various kinds of headers containing parameters that control the decoding process. For example, the MPEG-2 video standard includes sequence headers, enhanced group of pictures (GOP), and picture headers before the video data corresponding to those items. In JVT, the information needed to decode VCL data is grouped into parameter sets. Each parameter set is given an identifier that is subsequently used as a reference from a slice. Instead of sending the parameter sets inside (in-band) the stream, they can be sent outside (out-of-band) the stream.

Existing file formats do not provide a facility for storing the parameter sets associated with coded media data; nor do they provide a means for efficiently linking media data (i.e., samples or sub-samples) to parameters sets so that parameter sets can be efficiently retrieved and transmitted.

In the ISO media file format, the smallest unit that can be accessed without parsing media data is a sample, i.e., a whole picture in AVC. In many coded formats, a sample can be further divided into smaller units called sub-samples (also referred to as sample fragments or access unit fragments). In the case of AVC, a sub-sample corresponds to a slice. However, existing file formats do not support accessing sub-parts of a sample. For systems that need to flexibly form data stored in a file into packets for streaming, this lack of access to sub-samples hinders flexible packetization of JVT media data for streaming.

Another limitation of existing storage formats has to do with switching between stored streams with different bandwidth in response to changing network conditions when streaming media data. In a typical streaming scenario, one of the key requirements is to scale the bit rate of the compressed data in response to changing network conditions. This is typically achieved by encoding multiple streams with different bandwidth and quality settings for representative network conditions and storing them in one or more files. The server can then switch among these pre-coded streams in response to network conditions. In existing file formats, switching between streams is only possible at samples that do not depend on prior samples for reconstruction. Such samples are referred to as I-frames. No support is currently provided for switching between streams at samples that depend on prior samples for reconstruction (i.e., a P-frame or a B-frame that depend on multiple samples for reference).

The AVC standard provides a tool known as switching pictures (called SI- and SP-pictures) to enable efficient switching between streams, random access, and error resilience, as well as other features. A switching picture is a special type of picture whose reconstructed value is exactly equivalent to the picture it is supposed to switch to. Switching pictures can use reference pictures differing from those used to predict the picture that they match, thus providing more efficient coding than using I-frames. To use switching pictures stored in a file efficiently it is necessary to know which sets of pictures are equivalent and to know which pictures are used for prediction. Existing file formats do not provide this information and therefore this information must be extracted by parsing the coded stream, which is inefficient and slow.

Thus, there is a need to enhance storage methods to address the new capabilities provided by emerging video coding standards and to address the existing limitations of those storage methods.

SUMMARY OF THE INVENTION

Switch sample metadata defining switch sample sets associated with multimedia data is created. Each switch sample set includes samples that have identical decoding values. Further, a file associated with the multimedia data is formed. This file includes the switch sample metadata, as well as other information pertaining to the multimedia data.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 7A-7K illustrate exemplary data structures for storing sub-sample metadata;

FIGS. 14A-14E illustrate exemplary data structures for storing sequences metadata;

FIGS. 15A and 15B illustrate the use of a switch sample set for bit stream switching;

FIGS. 19A and 19B illustrate the use of a switch sample set to facilitate random access entry points into a bit stream;

FIGS. 20A and 20B illustrate the use of a switch sample set to facilitate error recovery.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Overview

Figure 1:
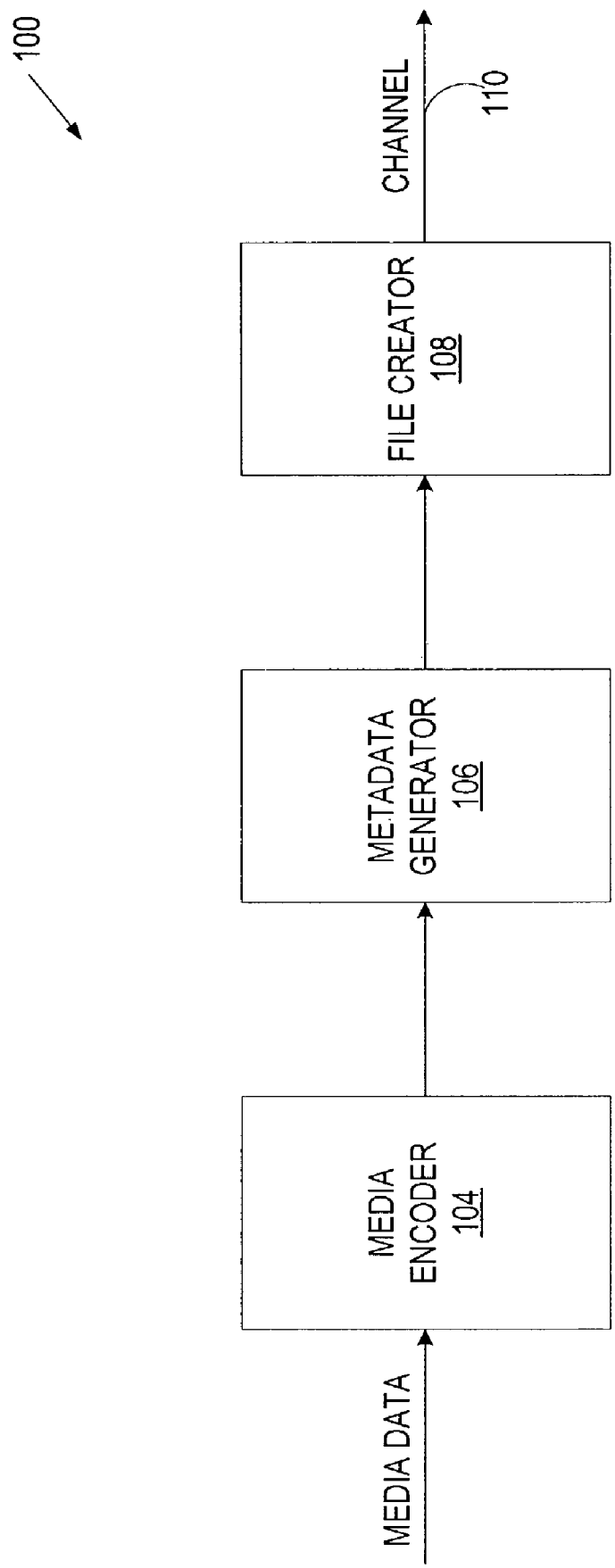
FIG. 1 is a block diagram of one embodiment of an encoding system.

Beginning with an overview of the operation of the invention, FIG. 1 illustrates one embodiment of an encoding system 100. The encoding system 100 includes a media encoder 104, a metadata generator 106 and a file creator 108. The media encoder 104 receives media data that may include video data (e.g., video objects created from a natural source video scene and other external video objects), audio data (e.g., audio objects created from a natural source audio scene and other external audio objects), synthetic objects, or any combination of the above. The media encoder 104 may consist of a number of individual encoders or include sub-encoders to process various types of media data. The media encoder 104 codes the media data and passes it to the metadata generator 106. The metadata generator 106 generates metadata that provides information about the media data according to a media file format. The media file format may be derived from the ISO media file format (or any of its derivatives such as MPEG-4, JPEG 2000, etc.), QuickTime or any other media file format, and also include some additional data structures. In one embodiment, additional data structures are defined to store metadata pertaining to sub-samples within the media data. In another embodiment, additional data structures are defined to store metadata linking portions of media data (e.g., samples or sub-samples) to corresponding parameter sets which include decoding information that has been traditionally stored in the media data. In yet another embodiment, additional data structures are defined to store metadata pertaining to various groups of samples within the metadata that are created based on inter-dependencies of the samples in the media data. In still another embodiment, an additional data structure is defined to store metadata pertaining to switch sample sets associated with the media data. A switch sample set refers to a set of samples that have identical decoding values but may depend on different samples. In yet other embodiments, various combinations of the additional data structures are defined in the file format being used. These additional data structures and their functionality will be described in greater detail below.

The file creator 108 stores the metadata in a file whose structure is defined by the media file format. In one embodiment, the file contains both the coded media data and metadata pertaining to that media data. Alternatively, the coded media data is included partially or entirely in a separate file and is linked to the metadata by references contained in the metadata file (e.g., via URLs). The file created by the file creator 108 is available on a channel 10 for storage or transmission.

Figure 2:
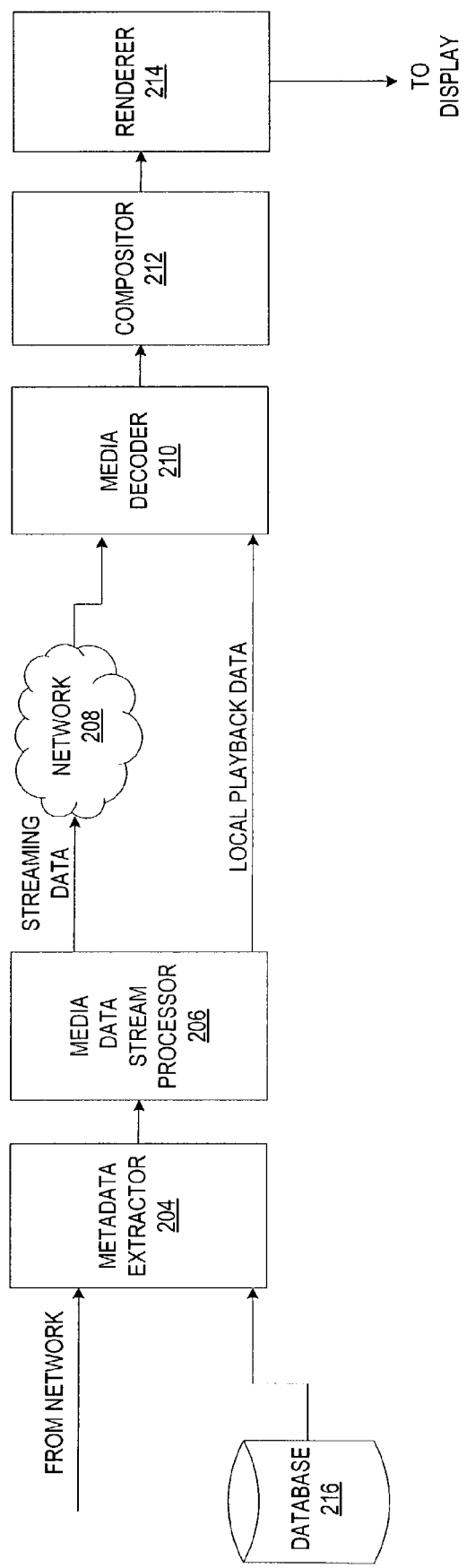
FIG. 2 is a block diagram of one embodiment of a decoding system.

FIG. 2 illustrates one embodiment of a decoding system 200. The decoding system 200 includes a metadata extractor 204, a media data stream processor 206, a media decoder 210, a compositor 212 and a renderer 214. The decoding system 200 may reside on a client device and be used for local playback. Alternatively, the decoding system 200 may be used for streaming data and have a server portion and a client portion communicating with each other over a network (e.g., Internet) 208. The server portion may include the metadata extractor 204 and the media data stream processor 206. The client portion may include the media decoder 210, the compositor 212 and the renderer 214.

The metadata extractor 204 is responsible for extracting metadata from a file stored in a database 216 or received over a network (e.g., from the encoding system 100). The file may or may not include media data associated with the metadata being extracted. The metadata extracted from the file includes one or more of the additional data structures described above.

The extracted metadata is passed to the media data stream processor 206 which also receives the associated coded media data. The media data stream processor 206 uses the metadata to form a media data stream to be sent to the media decoder 210. In one embodiment, the media data stream processor 206 uses metadata pertaining to sub-samples to locate sub-samples in the media data (e.g., for packetization). In another embodiment, the media data stream processor 206 uses metadata pertaining to parameter sets to link portions of the media data to its corresponding parameter sets. In yet another embodiment, the media data stream processor 206 uses metadata defining various groups of samples within the metadata to access samples in a certain group (e.g., for scalability by dropping a group containing samples on which no other samples depend to lower the transmitted bit rate in response to transmission conditions). In still another embodiment, the media data stream processor 206 uses metadata defining switch sample sets to locate a switch sample that has the same decoding value as the sample it is supposed to switch to but does not depend on the samples on which this resultant sample would depend on (e.g., to allow switching to a stream with a different bit-rate at a P-frame or B-frame).

Once the media data stream is formed, it is sent to the media decoder 210 either directly (e.g., for local playback) or over a network 208 (e.g., for streaming data) for decoding. The compositor 212 receives the output of the media decoder 210 and composes a scene which is then rendered on a user display device by the renderer 214.

Figure 3:
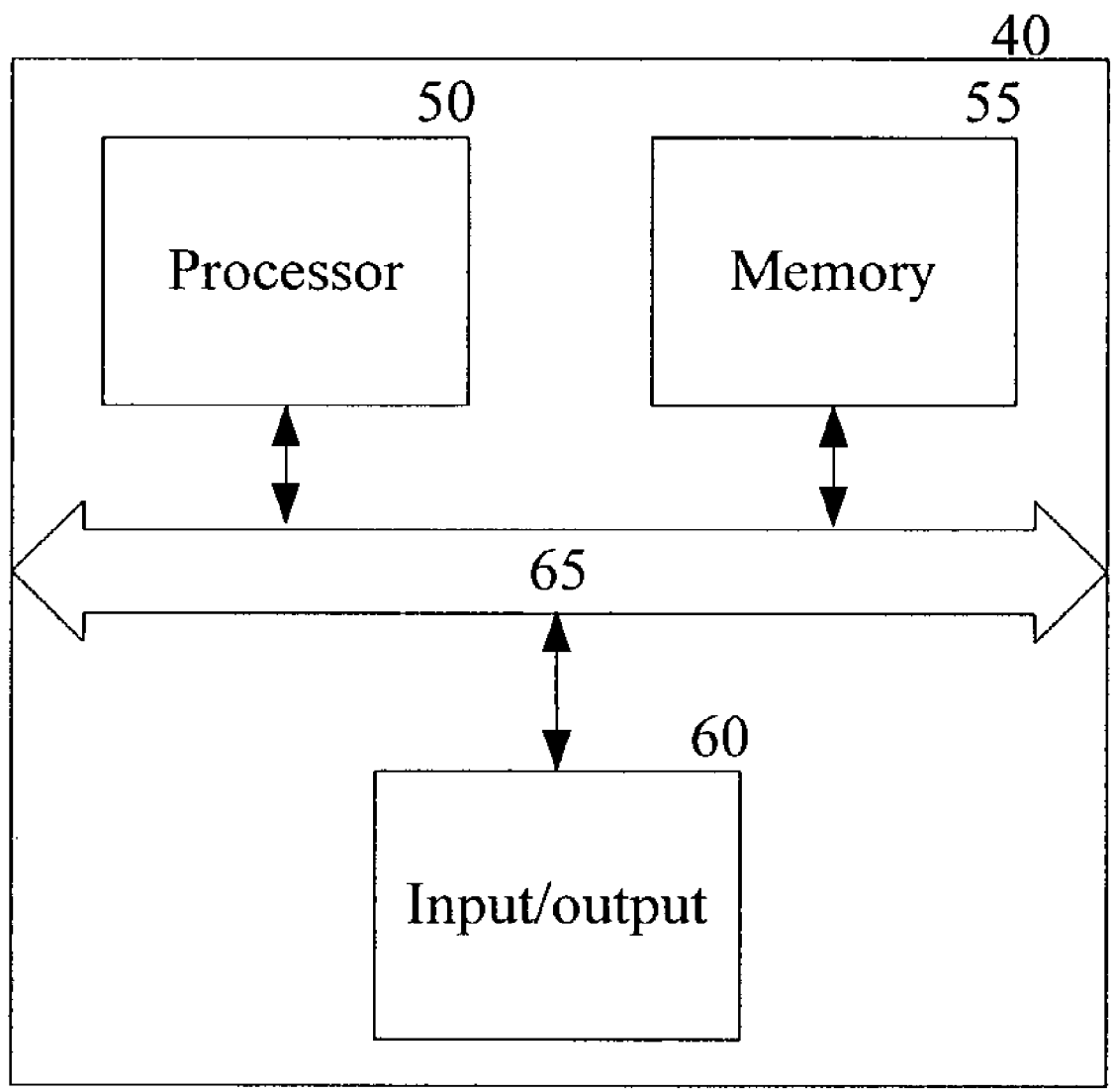
FIG. 3 is a block diagram of a computer environment suitable for practicing the invention.

The following description of FIG. 3 is intended to provide an overview of computer hardware and other operating components suitable for implementing the invention, but is not intended to limit the applicable environments. FIG. 3 illustrates one embodiment of a computer system suitable for use as a metadata generator 106 and/or a file creator 108 of FIG. 1, or a metadata extractor 204 and/or a media data stream processor 206 of FIG. 2.

The computer system 340 includes a processor 350, memory 355 and input/output capability 360 coupled to a system bus 365. The memory 355 is configured to store instructions which, when executed by the processor 350, perform the methods described herein. Input/output 360 also encompasses various types of computer-readable media, including any type of storage device that is accessible by the processor 350. One of skill in the art will immediately recognize that the term "computer-readable medium/media" further encompasses a carrier wave that encodes a data signal. It will also be appreciated that the system 340 is controlled by operating system software executing in memory 355. Input/output and related media 360 store the computer-executable instructions for the operating system and methods of the present invention. Each of the metadata generator 106, the file creator 108, the metadata extractor 204 and the media data stream processor 206 that are shown in FIGS. 1 and 2 may be a separate component coupled to the processor 350, or may be embodied in computer-executable instructions executed by the processor 350. In one embodiment, the computer system 340 may be part of, or coupled to, an ISP (Internet Service Provider) through input/output 360 to transmit or receive media data over the Internet. It is readily apparent that the present invention is not limited to Internet access and Internet web-based sites; directly coupled and private networks are also contemplated.

It will be appreciated that the computer system 340 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Sub-Sample Accessibility

Figure 4:
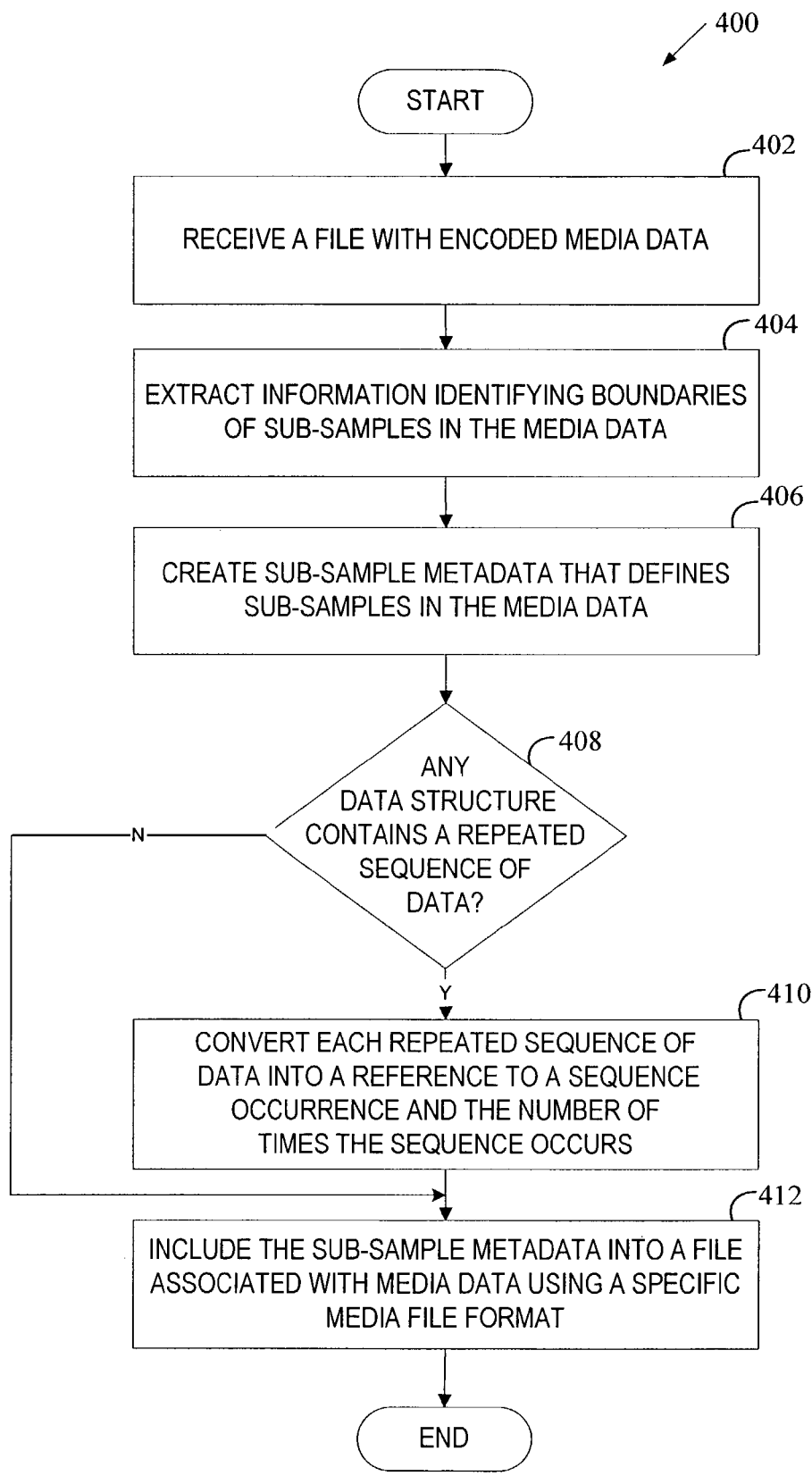
FIG. 4 is a flow diagram of a method for storing sub-sample metadata at an encoding system.
Figure 5:
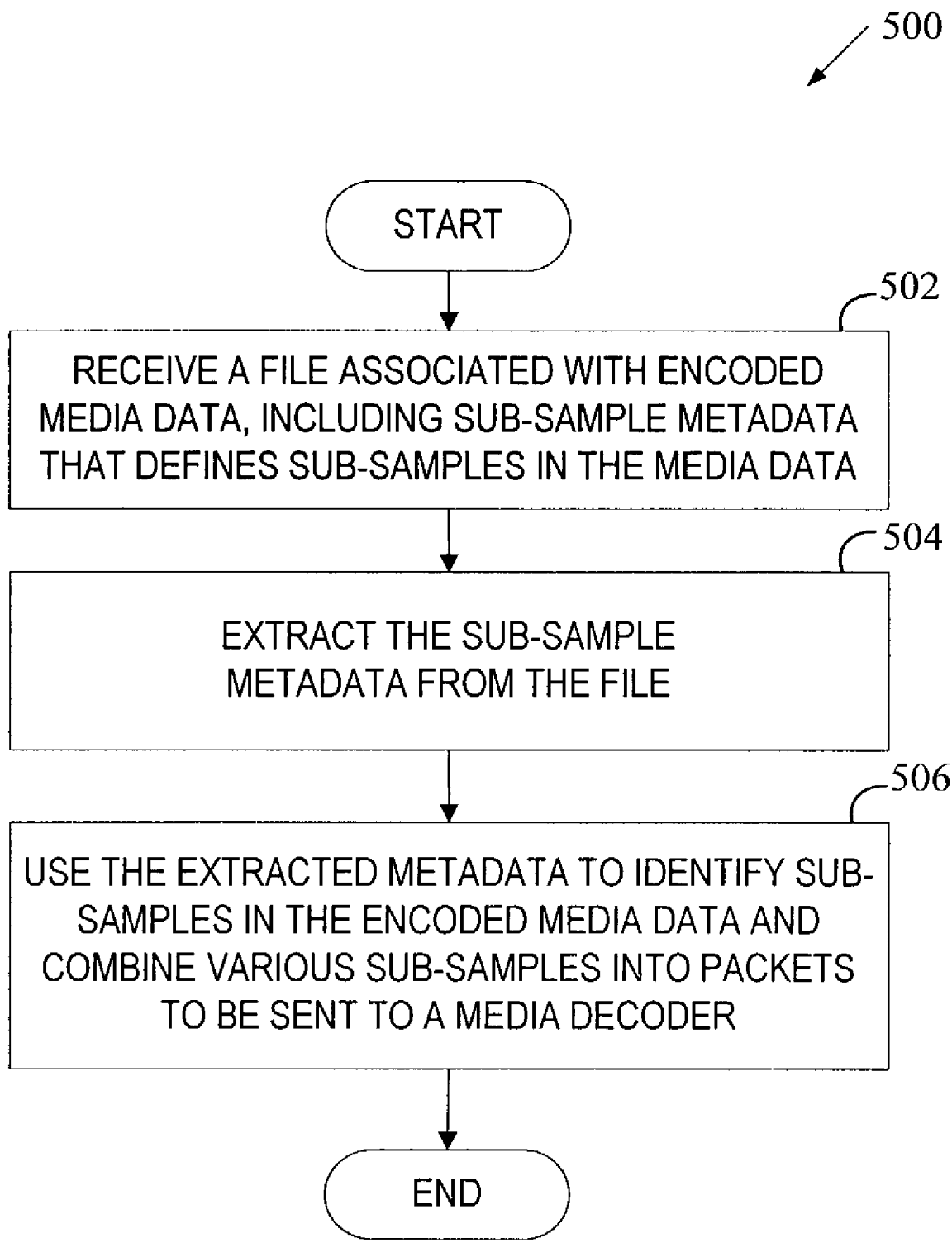
FIG. 5 is a flow diagram of a method for utilizing sub-sample metadata at a decoding system.

FIGS. 4 and 5 illustrate processes for storing and retrieving sub-sample metadata that are performed by the encoding system 100 and the decoding system 200 respectively. The processes may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Further-more, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 4 and 5 without departing from the scope of the invention and that no particular order is implied by the arrangement of blocks shown and described herein.

FIG. 4 is a flow diagram of one embodiment of a method 400 for creating sub-sample metadata at the encoding system 100. Initially, method 400 begins with processing logic receiving a file with encoded media data (processing block 402). Next, processing logic extracts information that identifies boundaries of sub-samples in the media data (processing block 404). Depending on the file format being used, the smallest unit of the data stream to which a time attribute can be attached is referred to as a sample (as defined by the ISO media file format or QuickTime), an access unit (as defined by MPEG-4), or a picture (as defined by JVT), etc. A sub-sample represents a contiguous portion of a data stream below the level of a sample. The definition of a sub-sample depends on the coding format but, in general, a sub-sample is a meaningful subunit of a sample that may be decoded as a singly entity or as a combination of sub-units to obtain a partial reconstruction of a sample. A sub-sample may also be called an access unit fragment. Often, sub-samples represent divisions of a sample's data stream so that each sub-sample has few or no dependencies on other sub-samples in the same sample. For example, in JVT, a sub-sample is a NAL packet. Similarly, for MPEG-4 video, a sub-sample would be a video packet.

In one embodiment, the encoding system 100 operates at the Network Abstraction Layer defined by JVT as described above. The JVT media data stream consists of a series of NAL packets where each NAL packet (also referred to as a NAL unit) contains a header part and a payload part. One type of NAL packet is used to include coded VCL data for each slice, or a single data partition of a slice. In addition, a NAL packet may be an information packet including supplemental enhancement information (SEI) messages. SEI messages represent optional data to be used in the decoding of corresponding slices. In JVT, a sub-sample could be a complete NAL packet with both header and payload.

At processing block 406, processing logic creates sub-sample metadata that defines sub-samples in the media data. In one embodiment, the sub-sample metadata is organized into a set of predefined data structures (e.g., a set of boxes). The set of predefined data structures may include a data structure containing information about the size of each sub-sample, a data structure containing information about the total number of sub-samples in each sample, a data structure containing information describing each sub-sample (e.g., what is defined as a sub-sample), or any other data structures containing data pertaining to the sub-samples.

Next, in one embodiment, processing logic determines whether any data structure contains a repeated sequence of data (decision box 408). If this determination is positive, processing logic converts each repeated sequence of data into a reference to a sequence occurrence and the number of times the repeated sequence occurs (processing block 410).

Afterwards, at processing block 412, processing logic includes the sub-sample metadata into a file associated with media data using a specific media file format (e.g., the JVT file format). Depending on the media file format, the sub-sample metadata may be stored with sample metadata (e.g., sub-sample data structures may be included in a sample table box containing sample data structures) or independently from the sample metadata.

FIG. 5 is a flow diagram of one embodiment of a method 500 for utilizing sub-sample metadata at the decoding system 200. Initially, method 500 begins with processing logic receiving a file associated with encoded media data (processing block 502). The file may be received from a database (local or external), the encoding system 100, or from any other device on a network. The file includes sub-sample metadata that defines sub-samples in the media data.

Next, processing logic extracts the sub-sample metadata from the file (processing block 504). As discussed above, the sub-sample metadata may be stored in a set of data structures (e.g., a set of boxes).

Further, at processing block 506, processing logic uses the extracted metadata to identify sub-samples in the encoded media data (stored in the same file or in a different file) and combines various sub-samples into packets to be sent to a media decoder, thus enabling flexible packetization of media data for streaming (e.g., to support error resilience, scalability, etc.).

Exemplary sub-sample metadata structures will now be described with reference to an extended ISO media file format (referred to as an extended MP4). It will be obvious to one versed in the art that other media file formats could be easily extended to incorporate similar data structures for storing sub-sample metadata.

Figure 6:
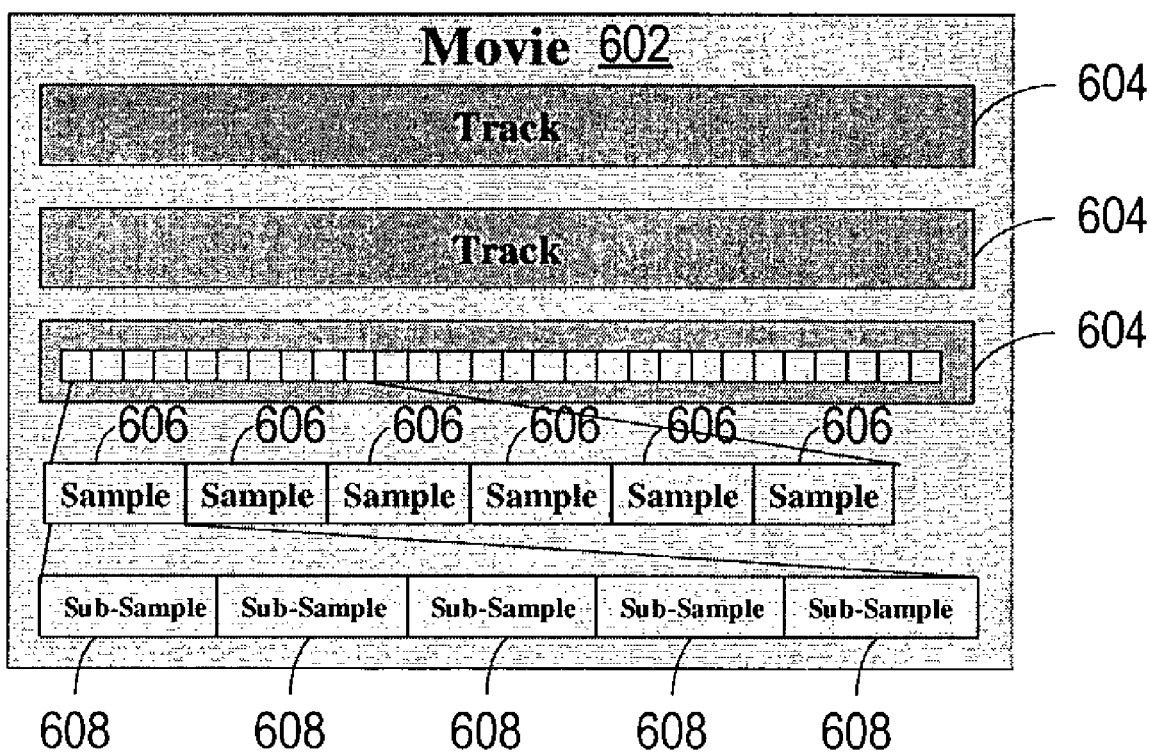
FIG. 6 illustrates an extended MP4 media stream model with sub-samples.

FIG. 6 illustrates the extended MP4 media stream model with sub-samples. Presentation data (e.g., a presentation containing synchronized audio and video) is represented by a movie 602. The movie 602 includes a set of tracks 604. Each track 604 represents a media data stream. Each track 604 is divided into samples 606. Each sample 606 represents a unit of media data at a particular time point. A sample 606 is further divided into sub-samples 608. In the JVT standard, a sub-sample 608 may represent a NAL packet or unit, such as a single slice of a picture, one data partition of a slice with multiple data partitions, an in-band parameter set, or an SEI information packet. Alternatively, a sub-sample 606 may represent any other structured element of a sample, such as the coded data representing a spatial or temporal region in the media. In one embodiment, any partition of the coded media data according to some structural or semantic criterion can be treated as a sub-sample.

FIGS. 7A-7L illustrate exemplary data structures for storing sub-sample metadata.

Figure 7A:
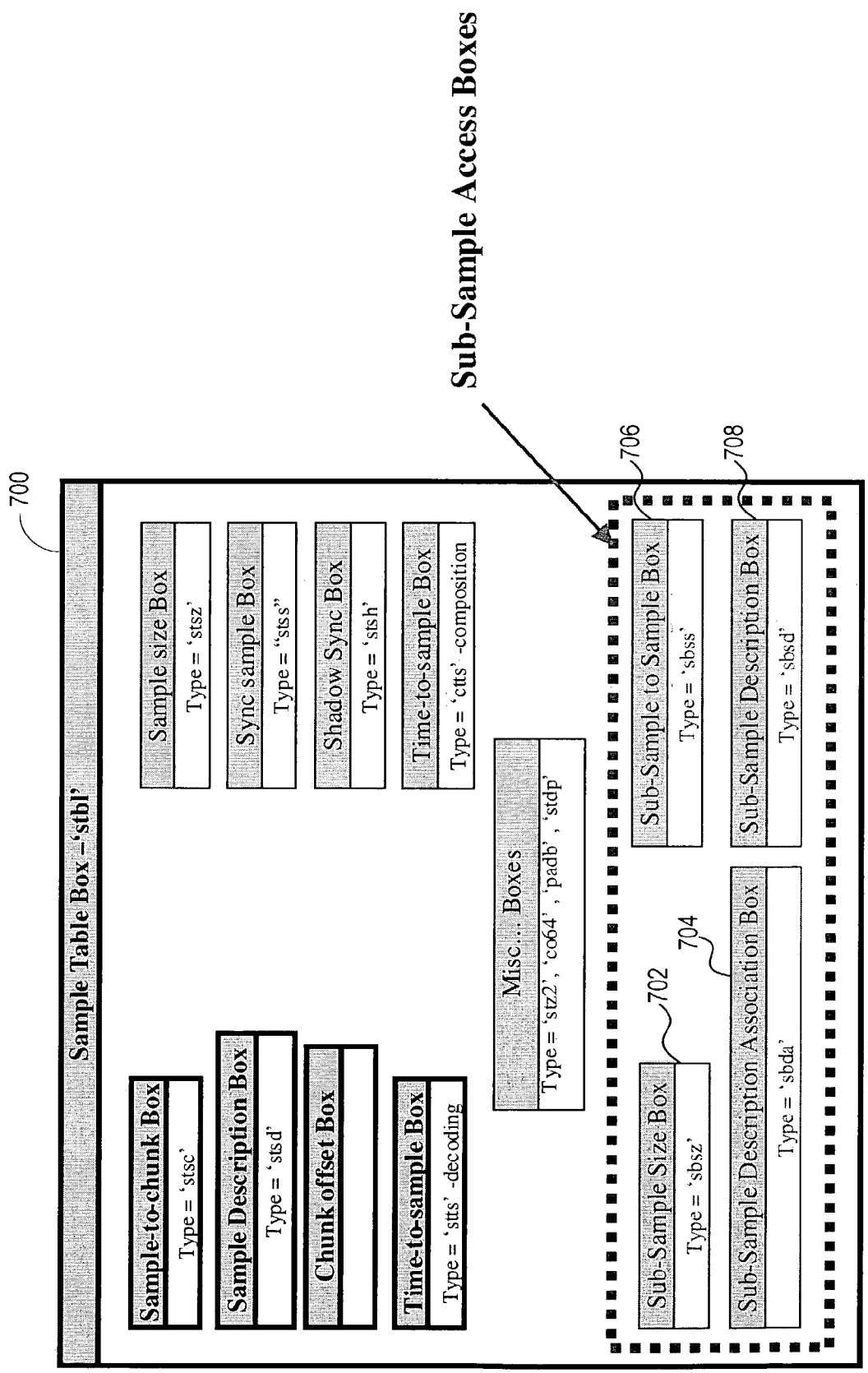

Referring to FIG. 7A, a sample table box 700 that contains sample metadata boxes defined by the ISO Media File Format is extended to include sub-sample access boxes such as a sub-sample size box 702, a sub-sample description association box 704, a sub-sample to sample box 706 and a sub-sample description box 708. In one embodiment, the use of sub-sample access boxes is optional.

Referring to FIG. 7B, a sample 710 may be, for example, divisible into slices such as a slice 712, data partitions such as partitions 714 and regions of interest (ROIs) such as a ROI 716. Each of these examples represents a different kind of division of samples into sub-samples. Sub-samples within a single sample may have different sizes.

A sub-sample size box 718 contains a version field that specifies the version of the sub-sample size box 718, a sub-sample size field specifying the default sub-sample size, a sub-sample count field to provide the number of sub-samples in the track, and an entry size field specifying the size of each sub-sample. If the sub-sample size field is set to 0, then the sub-samples have different sizes that are stored in the sub-sample size table 720. If the sub-sample size field is not set to 0, it specifies the constant sub-sample size, indicating that the sub-sample size table 720 is empty. The table 720 may have a fixed size of 32-bit or variable length field for representing the sub-sample sizes. If the field is varying length, the sub-sample table contains a field that indicates the length in bytes of the sub-sample size field.

Figure 7C:
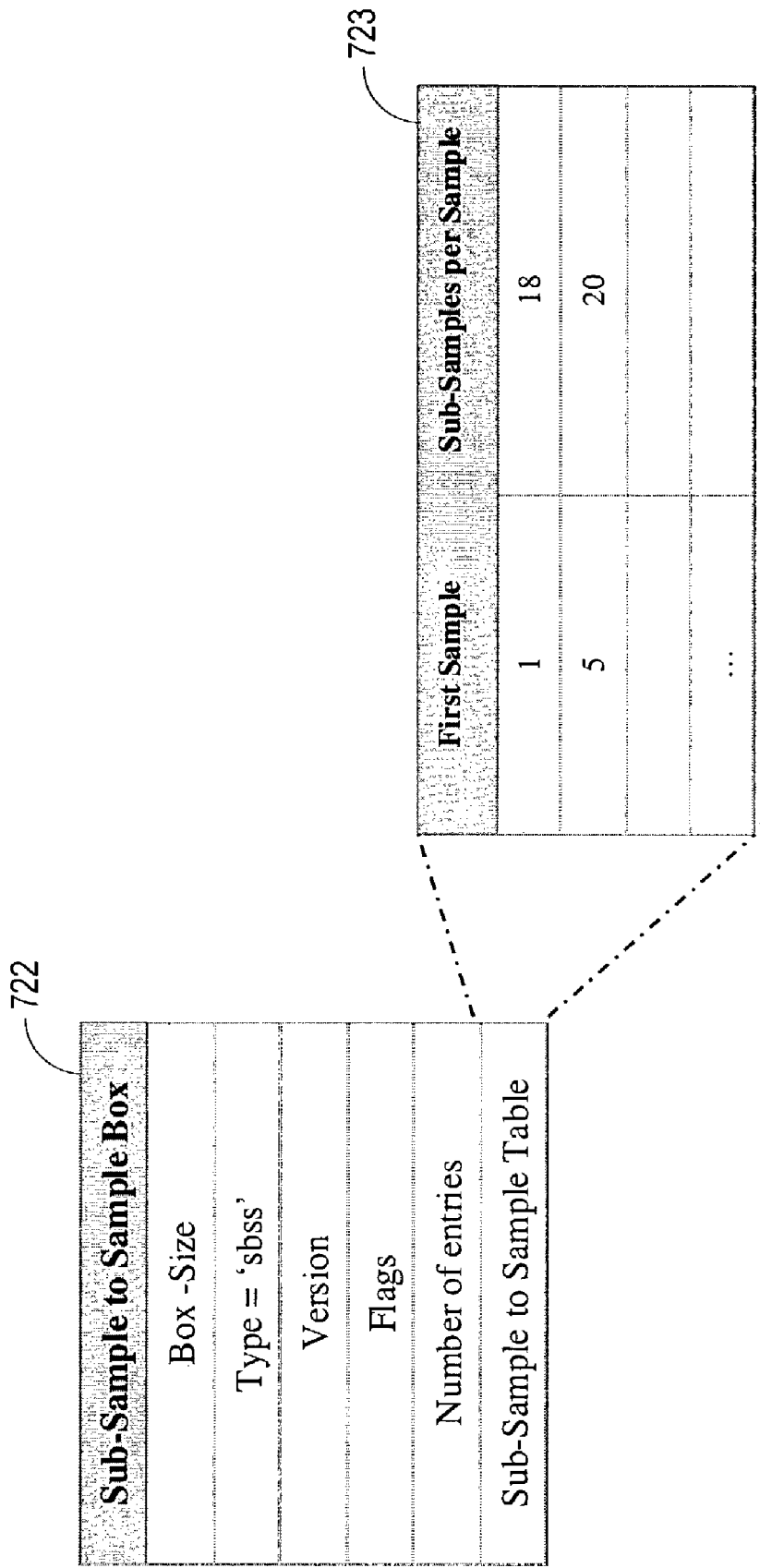

Referring to FIG. 7C, a sub-sample to sample box 722 includes a version field that specifies the version of the sub-sample to sample box 722, an entry count field that provides the number of entries in the table 723. Each entry in the sub-sample to sample table contains a first sample field that provides the index of the first sample in the run of samples sharing the same number of sub-samples-per-sample, and a sub-samples per sample field that provides the number of sub-samples in each sample within a run of samples.

The table 723 can be used to find the total number of sub-samples in the track by computing how many samples are in a run, multiplying this number by the appropriate sub-samples-per-sample, and adding the results of all the runs together.

Figure 7D:
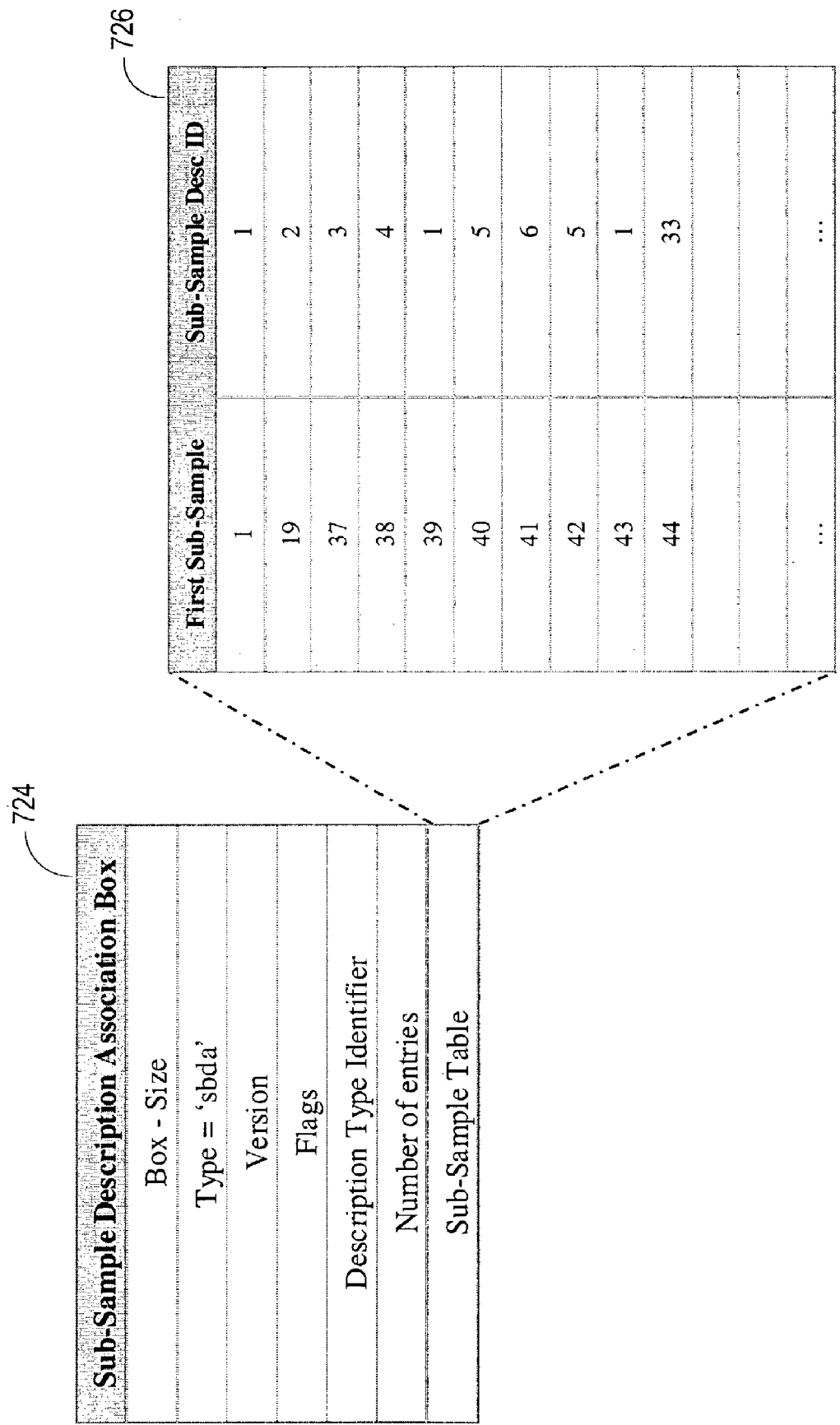

Referring to FIG. 7D, a sub-sample description association box 724 includes a version field that specifies the version of the sub-sample description association box 724, a description type identifier that indicates the type of sub-samples being described (e.g., NAL packets, regions of interest, etc.), and an entry count field that provides the number of entries in the table 726. Each entry in table 726 includes a sub-sample description type identifier field indicating a sub-sample description ID and a first sub-sample field that gives the index of the first sub-sample in a run of sub-samples which share the same sub-sample description ID.

The sub-sample description type identifier controls the use of the sub-sample description ID field. That is, depending on the type specified in the description type identifier, the sub-sample description ID field may itself specify a description ID that directly encodes the sub-samples descriptions inside the ID itself or the sub-sample description ID field may serve as an index to a different table (i.e., a sub-sample description table described below)? For example, if the description type identifier indicates a JVT description, the sub-sample description ID field may include a code specifying the characteristics of JVT sub-samples. In this case, the sub-sample description ID field may be a 32-bit field, with the least significant 8 bits used as a bit-mask to represent the presence of predefined data partition inside a sub-sample and the higher order 24 bits used to represent the NAL packet type or for future extensions.

Figure 7E:
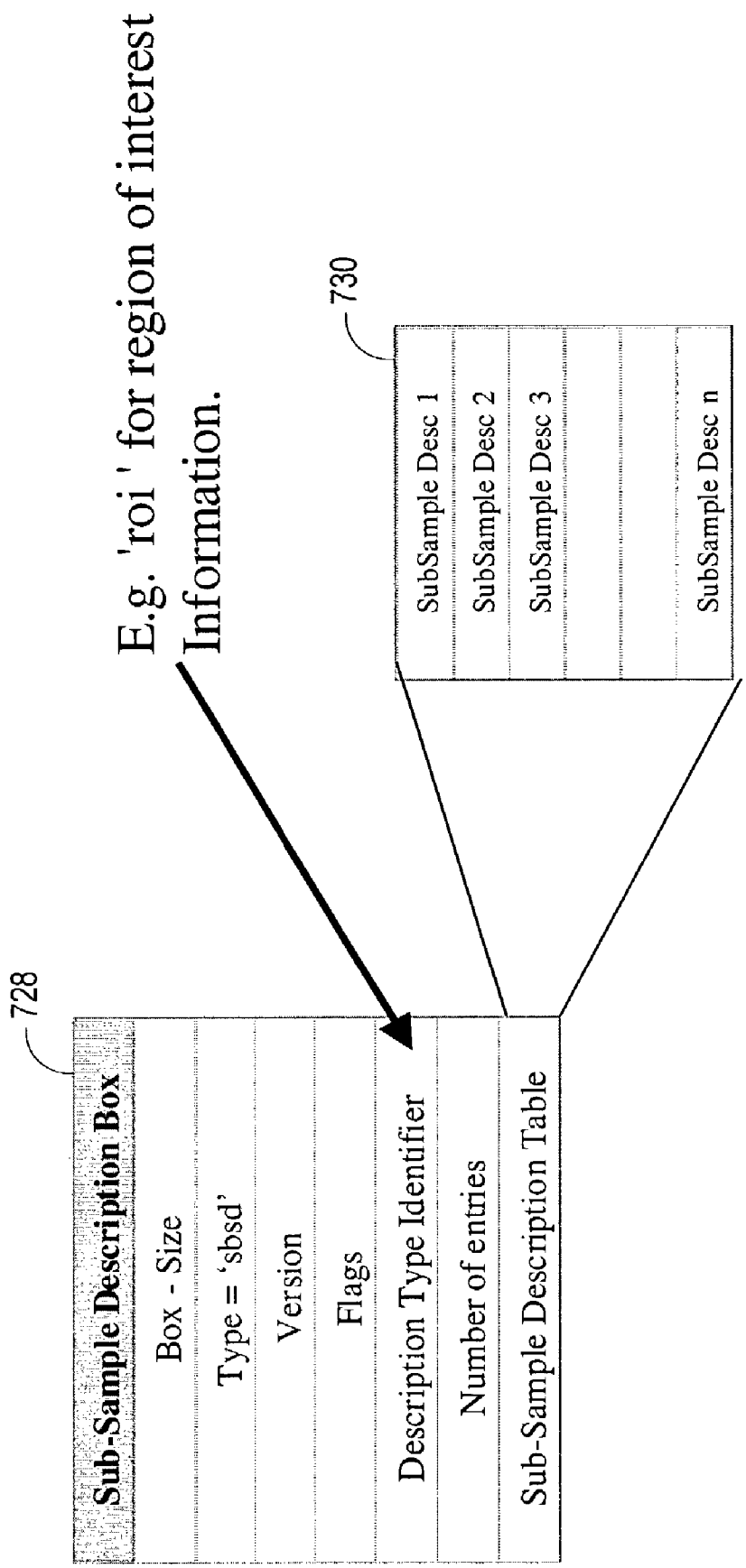

Referring to FIG. 7E, a sub-sample description box 728 includes a version field that specifies the version of the sub-sample description box 728, an entry count field that provides the number of entries in the table 730, a description type identifier field that provides a description type of a sub-sample description field providing information about the characteristics of the sub-samples, and a table containing one or more sub-sample description entries 730. The sub-sample description type identifies the type to which the descriptive information relates and corresponds to the same field in the sub-sample description association table 724. Each entry in table 730 contains a sub-sample description entry with information about the characteristics of the sub-samples associated with this description entry. The information and format of the description entry depend on the description type field. For example, when the description type is parameter set, then each description entry will contain the value of the parameter set.

The descriptive information may relate to parameter set information, information pertaining to ROI or any other information needed to characterize the sub-samples. For parameter sets, the sub-sample description association table 724 indicates the parameter set associated with each sub-sample. In such a case, the sub-sample description ID corresponds to the parameter set identifier. Similarly, a sub-sample can represent different regions-of-interest as follows. Define a sub-sample as one or more coded macroblocks and then use the sub-sample description association table to represent the division of the coded microblocks of a video frame or image into different regions. For example, the coded macroblocks in a frame can be divided into foreground and background macroblocks with two sub-sample description ID (e.g., sub-sample description IDs of 1 and 2), indicating assignment to the foreground and background regions, respectively.

Figure 7F:
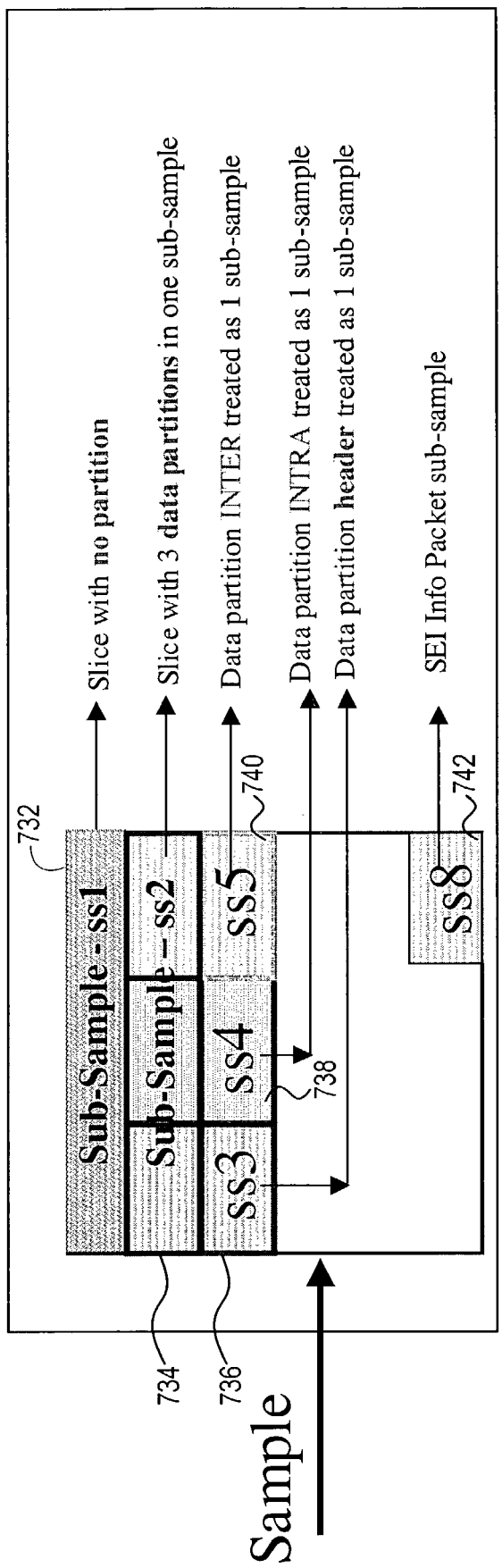
Figure 7G:
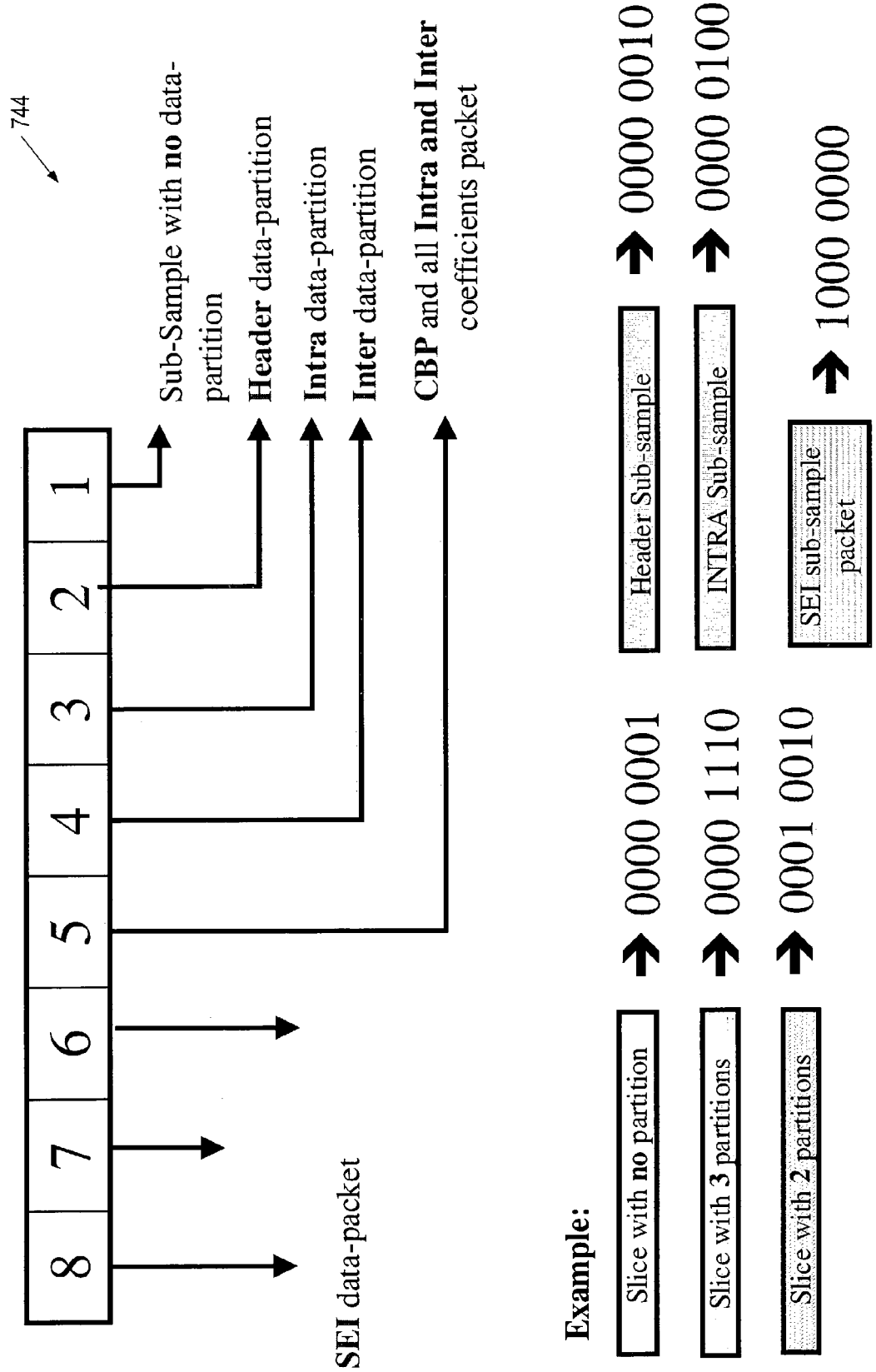
Figure 7H:
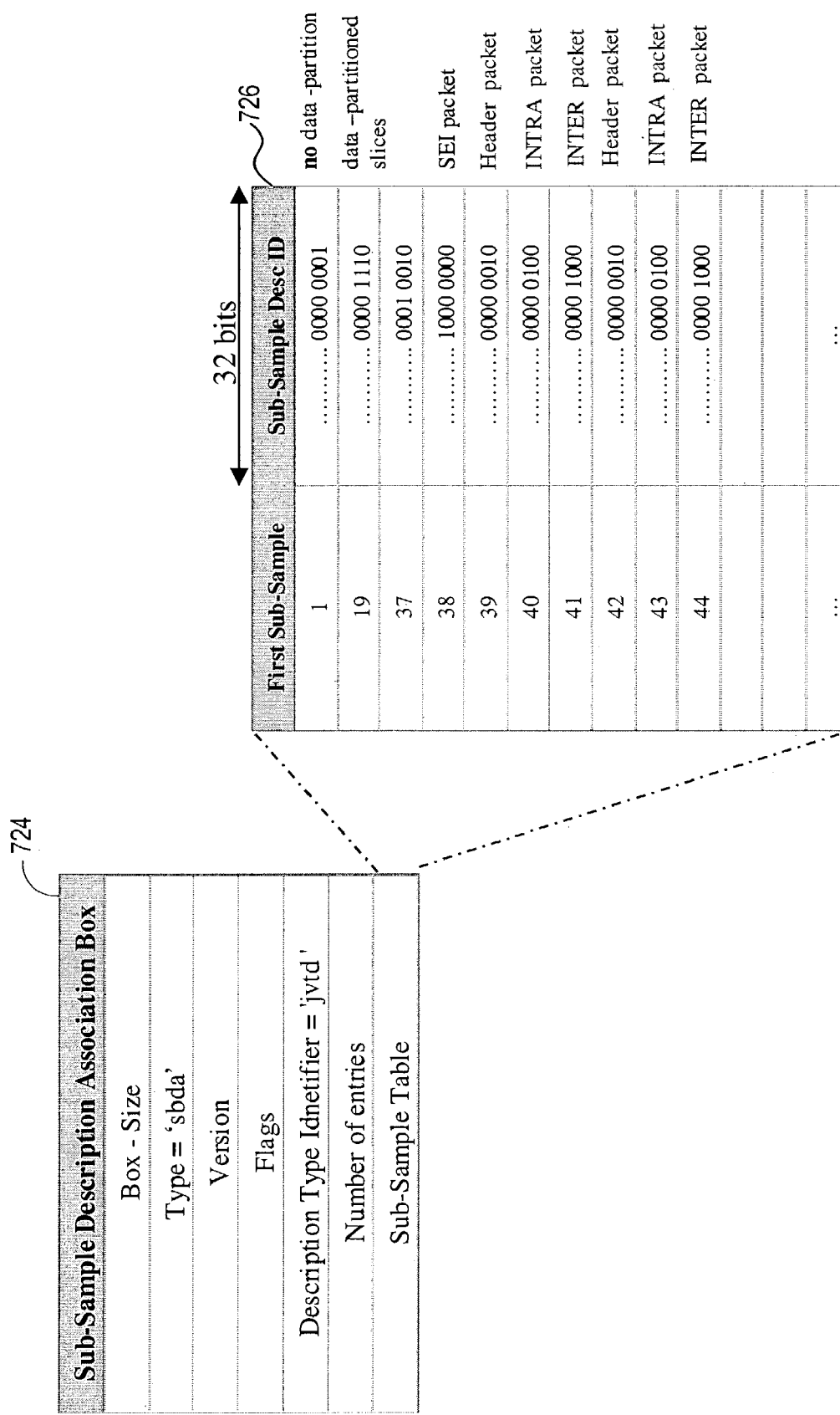

FIG. 7F illustrates different types of sub-samples. A sub-sample may represent a slice 732 with no partition, a slice 734 with multiple data partitions, a header 736 within a slice, a data partition 738 in the middle of a slice, the last data partition 740 of a slice, an SEI information packet 742, etc. Each of these sub-sample types may be associated with a specific value of an 8-bit mask 744 shown in FIG. 7G. The 8-bit mask may form the 8 least significant bits of the 32-bit sub-sample description ID field as discussed above. FIG. 7H illustrates the sub-sample description association box 724 having the description type identifier equal to "jvtd". The table 726 includes the 32-bit sub-sample description ID field storing the values illustrated in FIG. 7G.

FIGS. 7H-7K illustrate compression of data in a sub-sample description association table.

Referring to FIG. 7I, an uncompressed table 726 includes a sequence 750 of sub-sample description IDs that repeats a sequence 748. In a compressed table 746, the repeated sequence 750 has been compressed into a reference to the sequence 748 and the number of times this sequence occurs.

Figure 7J:
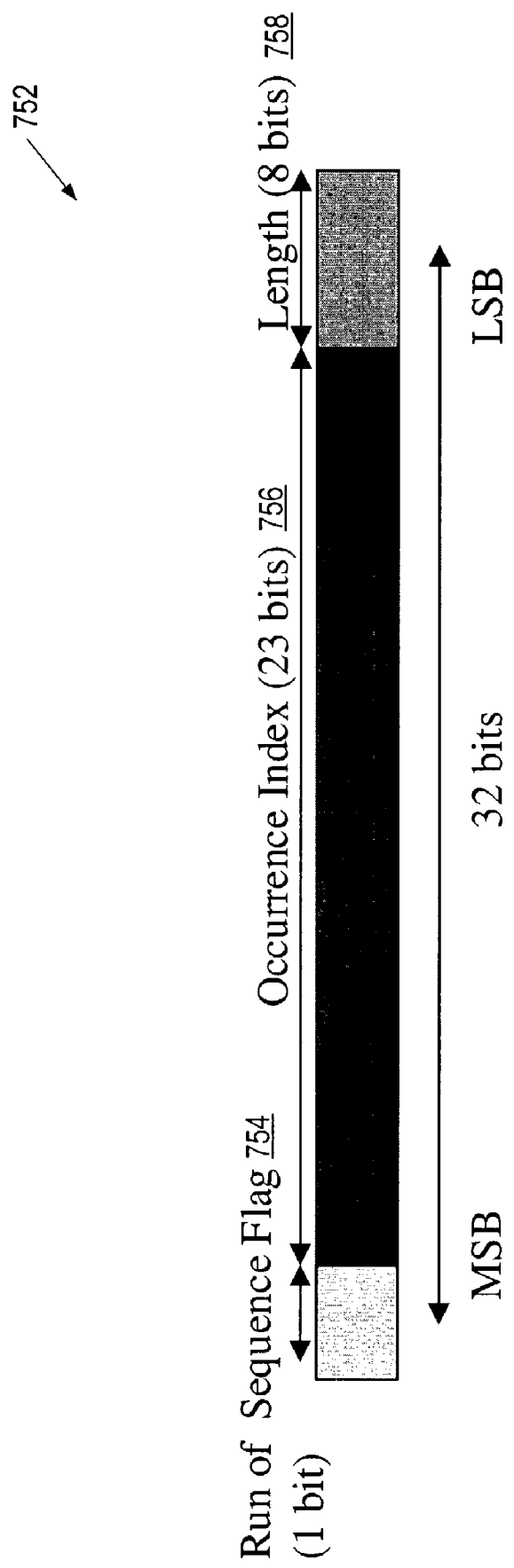

In one embodiment illustrated in FIG. 7J, a sequence occurrence can be encoded in the sub-sample description ID field by using its most significant bit as a run of sequence flag 754, its next 23 bits as an occurrence index 756, and its less significant bits as an occurrence length 758. If the flag 754 is set to 1, then it indicates that this entry is an occurrence of a repeated sequence. Otherwise, this entry is a sub-sample description ID. The occurrence index 756 is the index in the sub-sample description association box 724 of the first occurrence of the sequence, and the length 758 indicates the length of the repeated sequence occurrence.

Figure 7K:
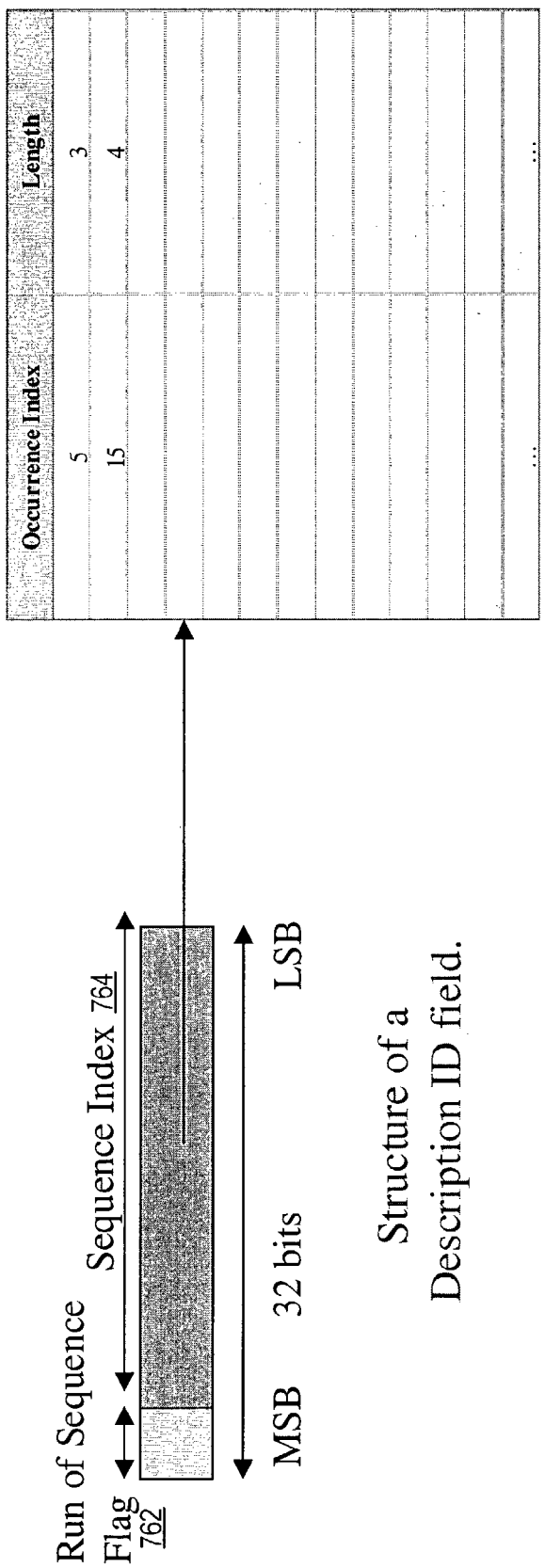

In another embodiment illustrated in FIG. 7K, a repeated sequence occurrence table 760 is used to represent the repeated sequence occurrence. The most significant bit of the sub-sample description ID field is used as a run of sequence flag 762 indicating whether the entry is a sub-sample description ID or a sequence index 764 of the entry in the repeated sequence occurrence table 760 that is part of the sub-sample description association box 724. The repeated sequence occurrence table 760 includes an occurrence index field to specify the index in the sub-sample description association box 724 of the first item in the repeated sequence and a length field to specify the length of the repeated sequence.

Parameter Sets

In certain media formats, such as JVT, the "header" information containing the critical control values needed for proper decoding of media data are separated/decoupled from the rest of the coded data and stored in parameter sets. Then, rather than mixing these control values in the stream along with coded data, the coded data can refer to necessary parameter sets using a mechanism such as a unique identifier. This approach decouples the transmission of higher level coding parameters from coded data. At the same time, it also reduces redundancies by sharing common sets of control values as parameter sets.

To support efficient transmission of stored media streams that use parameter sets, a sender or player must be able to quickly link coded data to a corresponding parameter in order to know when and where the parameter set must be transmitted or accessed. One embodiment of the present invention provides this capability by storing data specifying the associations between parameter sets and corresponding portions of media data as parameter set metadata in a media file format.

Figure 8:
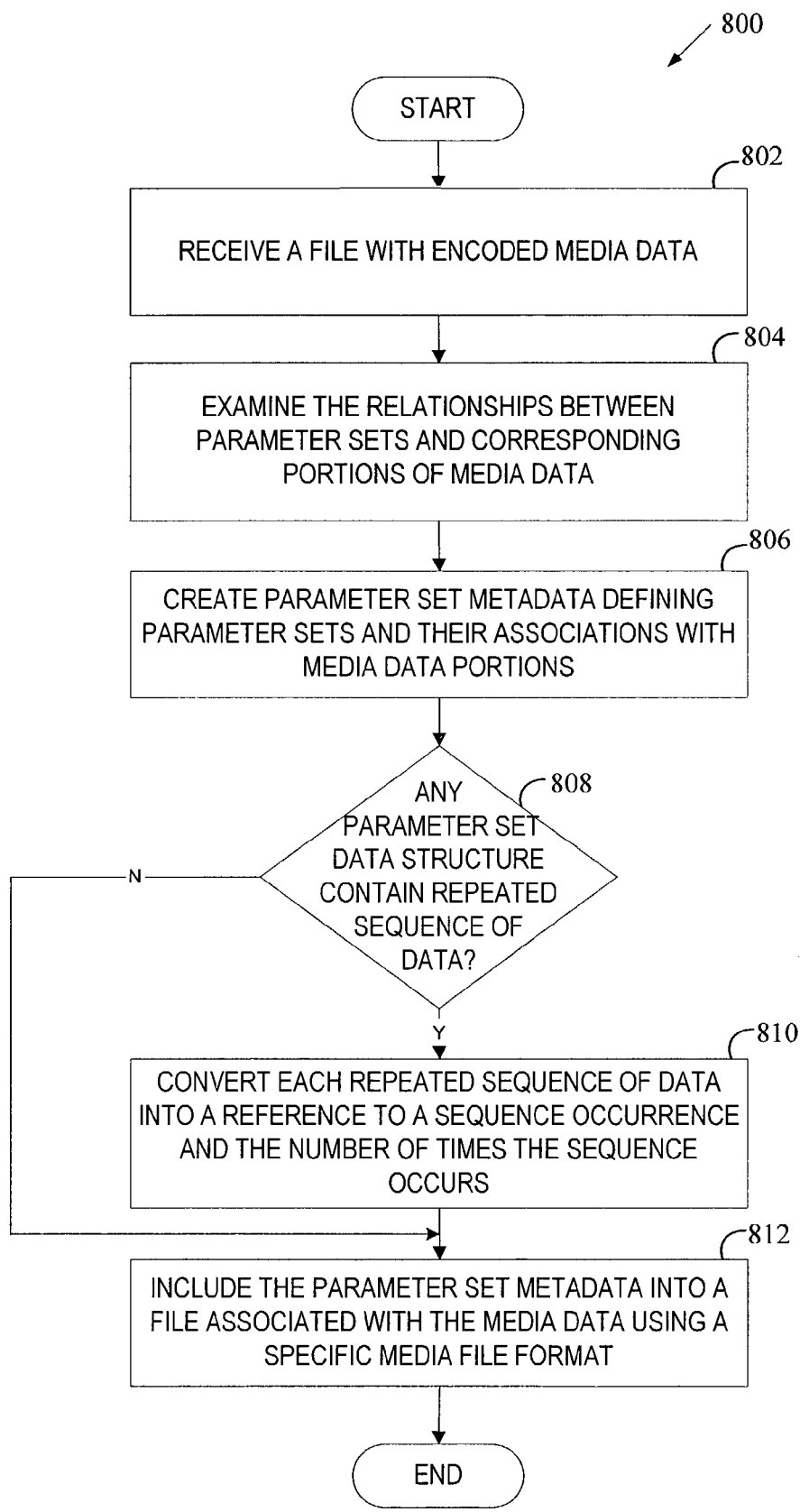
FIG. 8 is a flow diagram of a method for storing parameter set metadata at an encoding system.
Figure 9:
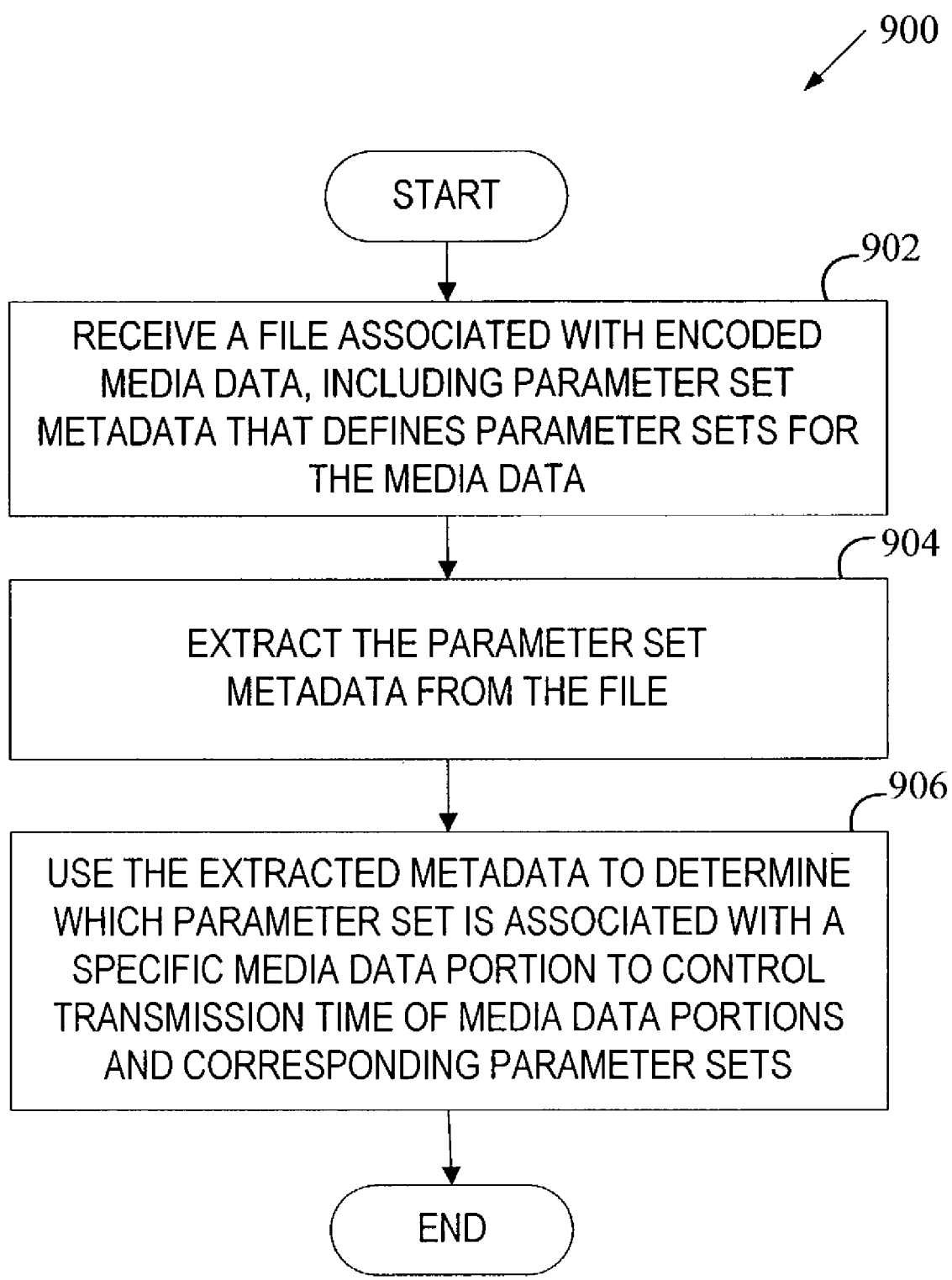
FIG. 9 is a flow diagram of a method for utilizing parameter set metadata at a decoding system.

FIGS. 8 and 9 illustrate processes for storing and retrieving parameter set metadata that are performed by the encoding system 100 and the decoding system 200 respectively. The processes may be performed by processing logic that may comprise hardware (e.g., circuitry, dedicated logic, etc.), software (such as run on a general purpose computer system or a dedicated machine), or a combination of both.

FIG. 8 is a flow diagram of one embodiment of a method 800 for creating parameter set metadata at the encoding system 100. Initially, method 800 begins with processing logic receiving a file with encoded media data (processing block 802). The file includes sets of encoding parameters that specify how to decode portions of the media data. Next, processing logic examines the relationships between the sets of encoding parameters referred to as parameter sets and the corresponding portions of the media data (processing block 804) and creates parameter set metadata defining the parameter sets and their associations with the media data portions (processing block 806). The media data portions may be represented by samples or sub-samples.

In one embodiment, the parameter set metadata is organized into a set of predefined data structures (e.g., a set of boxes). The set of predefined data structures may include a data structure containing descriptive information about the parameter sets and a data structure containing information that defines associations between samples and corresponding parameter sets. In one embodiment, the set of predefined data structures also includes a data structure containing information that defines associations between sub-samples and corresponding parameter sets. The data structures containing sub-sample to parameter set association information may or may not override the data structures containing sample to parameter set association information.

Next, in one embodiment, processing logic determines whether any parameter set data structure contains a repeated sequence of data (decision box 808). If this determination is positive, processing logic converts each repeated sequence of data into a reference to a sequence occurrence and the number of times the sequence occurs (processing block 810).

Afterwards, at processing block 812, processing logic includes the parameter set metadata into a file associated with media data using a specific media file format (e.g., the JVT file format). Depending on the media file format, the parameter set metadata may be stored with track metadata and/or sample metadata (e.g., the data structure containing descriptive information about parameter sets may be included in a track box and the data structure(s) containing association information may be included in a sample table box) or independently from the track metadata and/or sample metadata.

FIG. 9 is a flow diagram of one embodiment of a method 900 for utilizing parameter set metadata at the decoding system 200. Initially, method 900 begins with processing logic receiving a file associated with encoded media data (processing block 902). The file may be received from a database (local or external), the encoding system 100, or from any other device on a network. The file includes parameter set metadata that defines parameter sets for the media data and associations between the parameter sets and corresponding portions of the media data (e.g., corresponding samples or sub-samples).

Next, processing logic extracts the parameter set metadata from the file (processing block 904). As discussed above, the parameter set metadata may be stored in a set of data structures (e.g., a set of boxes).

Further, at processing block 906, processing logic uses the extracted metadata to determine which parameter set is associated with a specific media data portion (e.g., a sample or a sub-sample). This information may then be used to control transmission time of media data portions and corresponding parameter sets. That is, a parameter set that is to be used to decode a specific sample or sub-sample must be sent prior to a packet containing the sample or sub-sample or with the packet containing the sample or sub-sample.

Accordingly, the use of parameter set metadata enables independent transmission of parameter sets on a more reliable channel, reducing the chance of errors or data loss causing parts of the media stream to be lost.

Exemplary parameter set metadata structures will now be described with reference to an extended ISO media file format (referred to as an extended ISO). It should be noted, however, that other media file formats can be extended to incorporate various data structures for storing parameter set metadata.

FIGS. 10A-10E illustrate exemplary data structures for storing parameter set metadata.

Figure 10A:
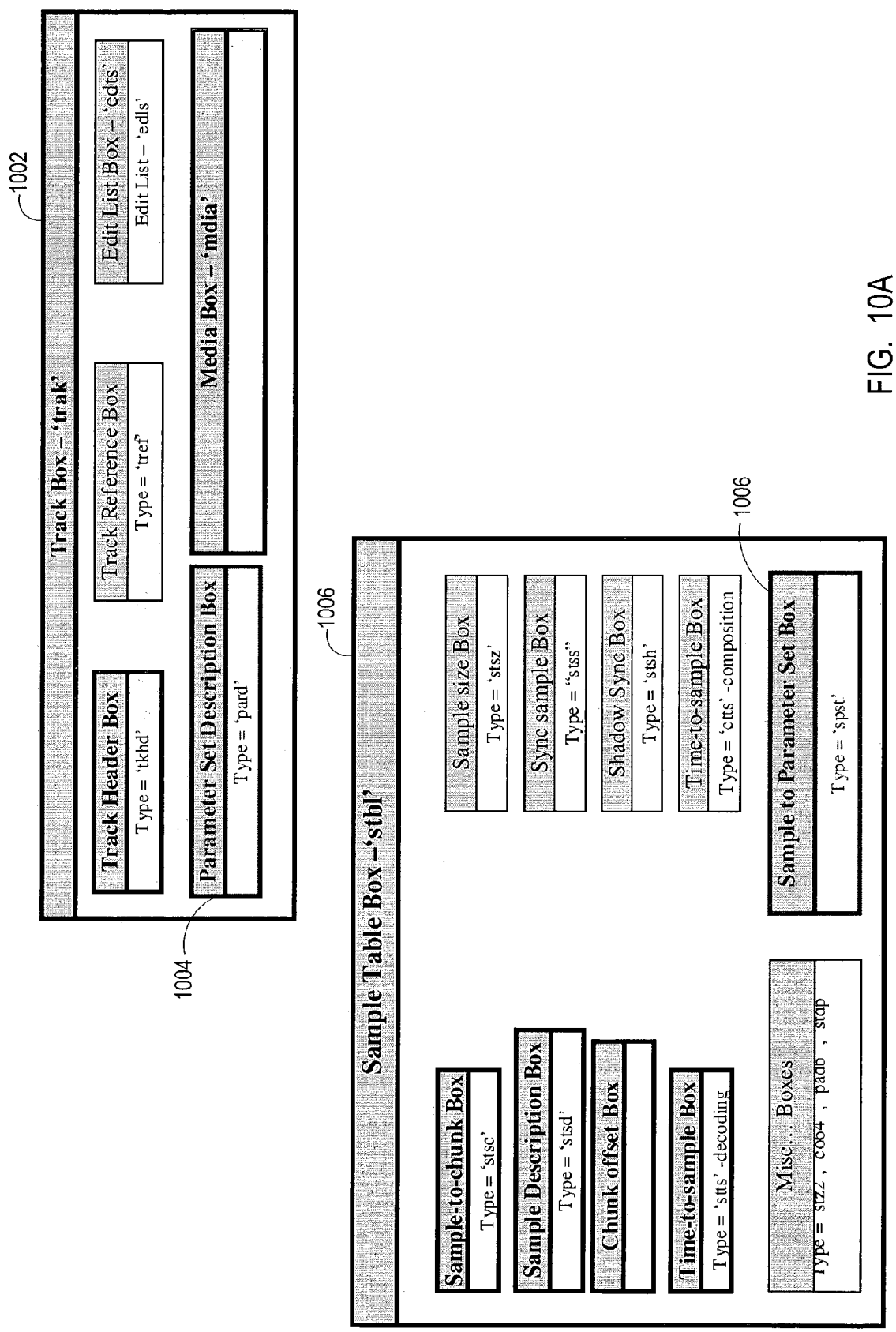
FIGS. 10A-10E illustrate exemplary data structures for storing parameter set metadata.

Referring to FIG. 10A, a track box 1002 that contains track metadata boxes defined by the ISO file format is extended to include a parameter set description box 1004. In addition, a sample table box 1006 that contains sample metadata boxes defined by ISO file format is extended to include a sample to parameter set box 1008. In one embodiment, the sample table box 1006 includes a sub-sample to parameter set box which may override the sample to parameter set box 1008 as will be discussed in more detail below.

In one embodiment, the parameter set metadata boxes 1004 and 1008 are mandatory. In another embodiment, only the parameter set description box 1004 is mandatory. In yet another embodiment, all of the parameter set metadata boxes are optional.

Figure 10B:
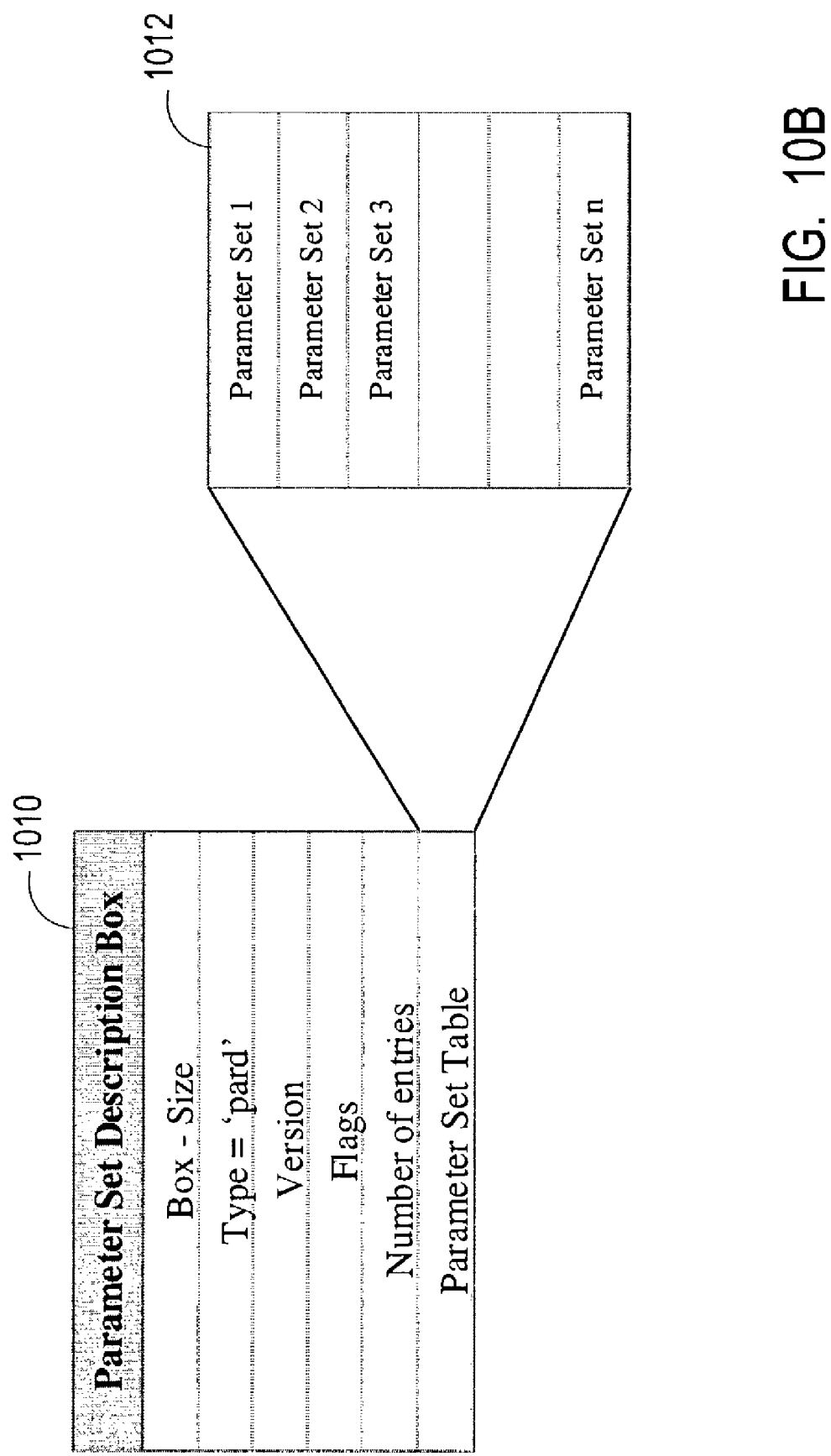

Referring to FIG. 10B, a parameter set description box 1010 contains a version field that specifies the version of the parameter set description box 1010, a parameter set description count field to provide the number of entries in a table 1012, and a parameter set entry field containing entries for the parameter sets themselves.

Figure 10C:
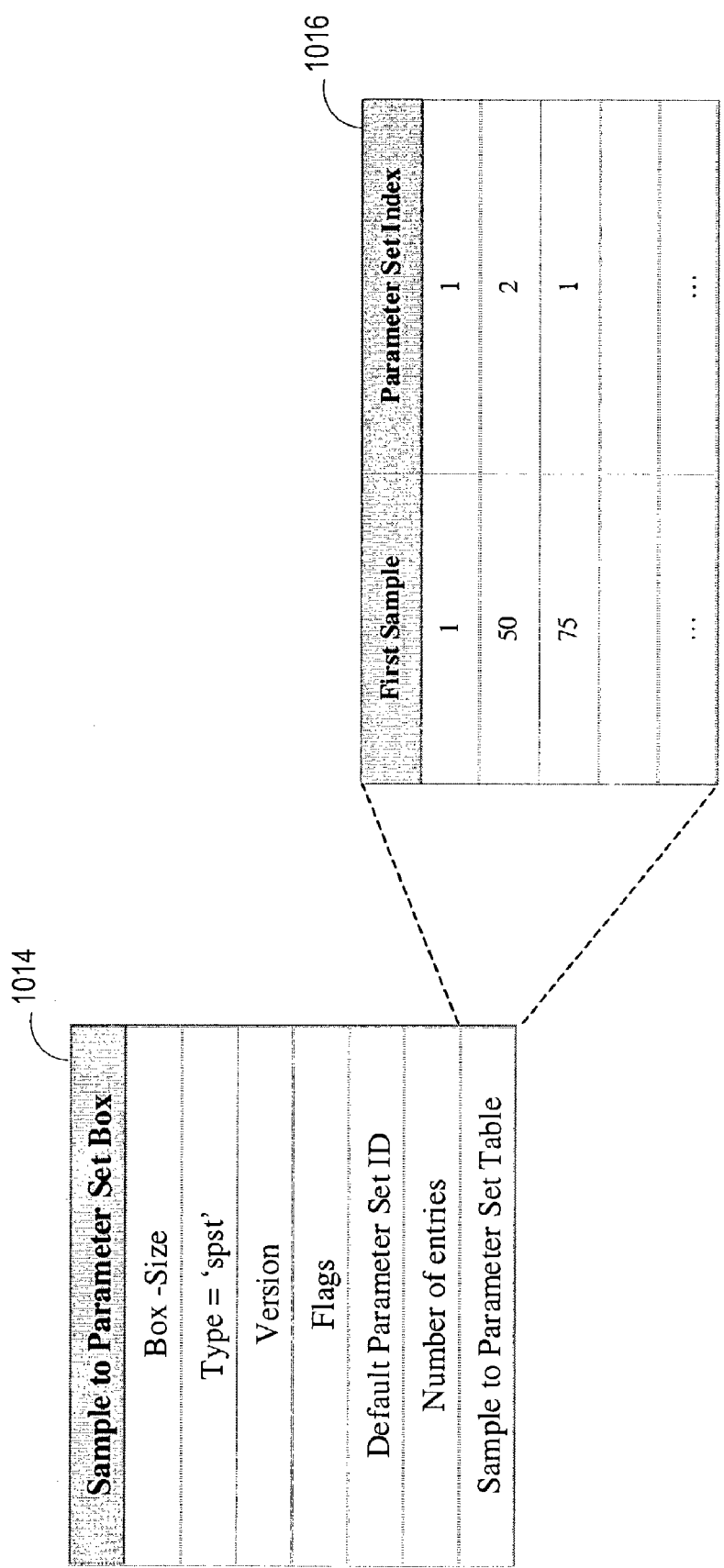

Parameter sets may be referenced from the sample level or the sub-sample level. Referring to FIG. 10C, a sample to parameter set box 1014 provides references to parameter sets from the sample level. The sample to parameter set box 1014 includes a version field that specifies the version of the sample to parameter set box 1014, a default parameter set ID field that specifies the default parameter set ID, an entry count field that provides the number of entries in the table 1016. Each entry in table 1016 contains a first sample field providing the index of a first sample in a run of samples that share the same parameter set, and a parameter set index specifying the index to the parameter set description box 1010. If the default parameter set ID is equal to 0, then the samples have different parameter sets that are stored in the table 1016. Otherwise, a constant parameter set is used and no array follows.

In one embodiment, data in the table 1016 is compressed by converting each repeated sequence into a reference to an initial sequence and the number of times this sequence occurs, as discussed in more detail above in conjunction with the sub-sample description association table.

Figure 10D:
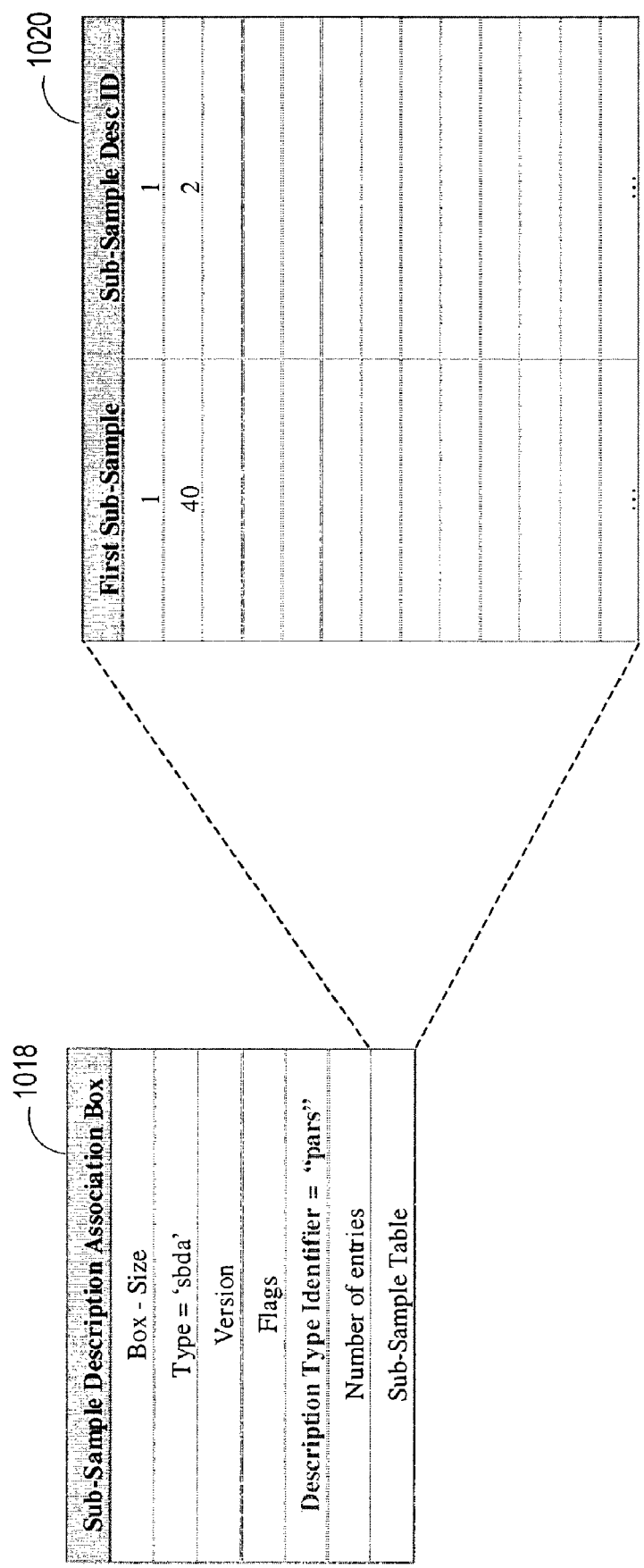

Parameter sets may be referenced from the sub-sample level by defining associations between parameter sets and sub-samples. In one embodiment, the associations between parameter sets and sub-samples are defined using a sub-sample description association box described above. FIG. 10D illustrates a sub-sample description association box 1018 with the description type identifier referring to parameter sets (e.g., the description type identifier is equal to "pars"). Based on this description type identifier, the sub-sample description ID in the table 1020 indicates the index in the parameter set description box 1010.

In one embodiment, when the sub-sample description association box 1018 with the description type identifier referring to parameter sets is present, it overrides the sample to parameter set box 1014.

A parameter set may change between the time the parameter set is created and the time the parameter set is used to decode a corresponding portion of media data. If such a change occurs, the decoding system 200 receives a parameter update packet specifying a change to the parameter set. The parameter set metadata includes data identifying the state of the parameter set both before the update and after the update.

Figure 10E:
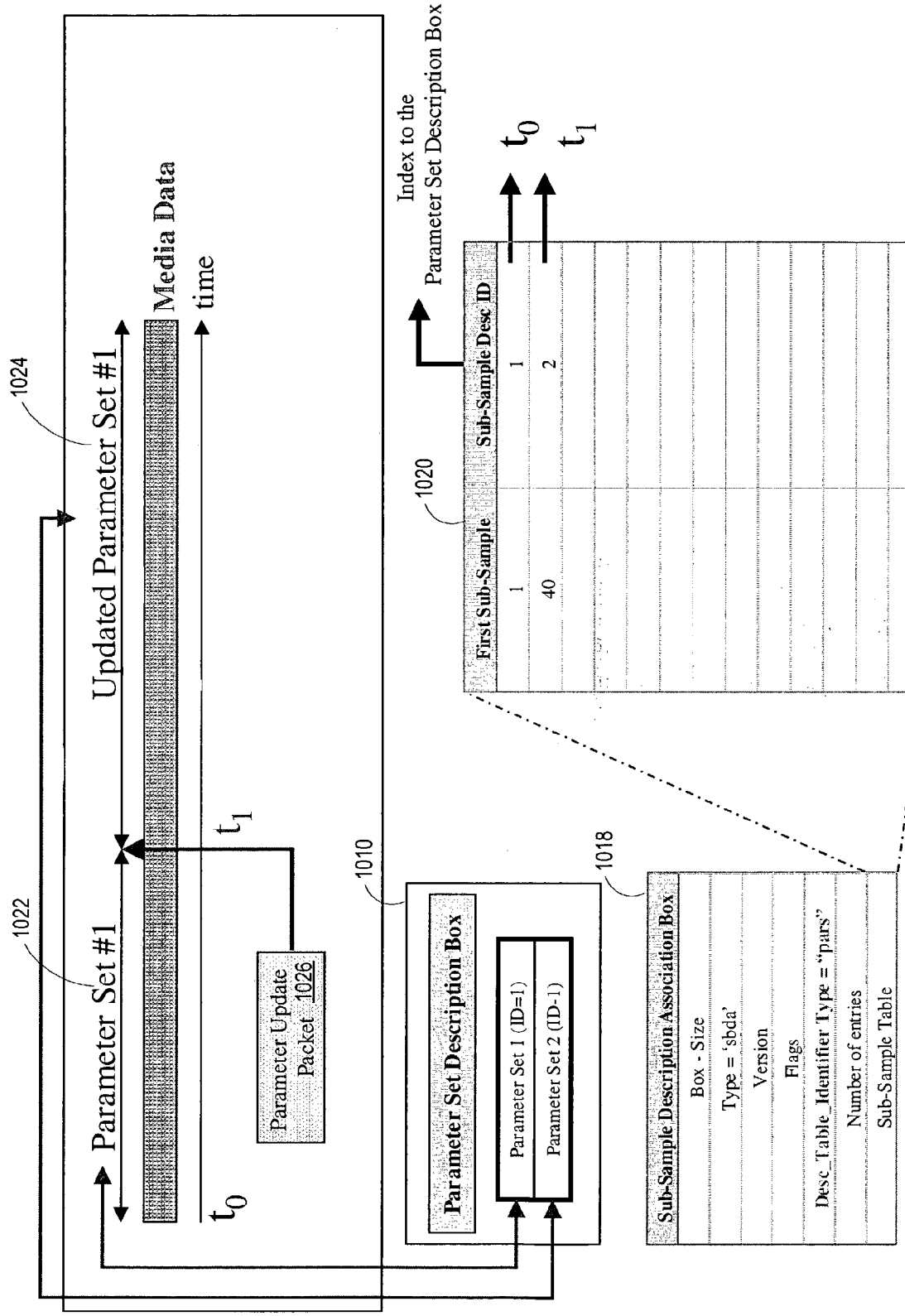

Referring to FIG. 10E, the parameter set description box 1010 includes an entry for the initial parameter set 1022 created at time to and an entry for an updated parameter set 1024 created in response to a parameter update packet 1026 received at time $t_1$. The sub-sample description association box 1018 associates the two parameter sets with corresponding sub-samples.

Sample Groups

While the samples within a track can have various logical groupings (partitions) of samples into sequences (possibly non-consecutive) that represent high-level structures in the media data, existing file formats do not provide convenient mechanisms for representing and storing such groupings. For example, advanced coding formats such as JVT organize samples within a single track into groups based on their inter-dependencies. These groups (referred to herein as sequences or sample groups) may be used to identify chains of disposable samples when required by network conditions, thus supporting temporal scalability. Storing metadata that defines sample groups in a file format enables the sender of the media to easily and efficiently implement the above features.

An example of a sample group is a set of samples whose inter-frame dependencies allow them to be decoded independently of other samples. In JVT, such a sample group is referred to as an enhanced group of pictures (enhanced GOP). In an enhanced GOP, samples may be divided into sub-sequences. Each sub-sequence includes a set of samples that depend on each other and can be disposed of as a unit. In addition, samples of an enhanced GOP may be hierarchically structured into layers such that samples in a higher layer are predicted only from samples in a lower layer, thus allowing the samples of the highest layer to be disposed of without affecting the ability to decode other samples. The lowest layer that includes samples that do not depend on samples in any other layers is referred to as a base layer. Any other layer that is not the base layer is referred to as an enhancement layer.

Figure 11:
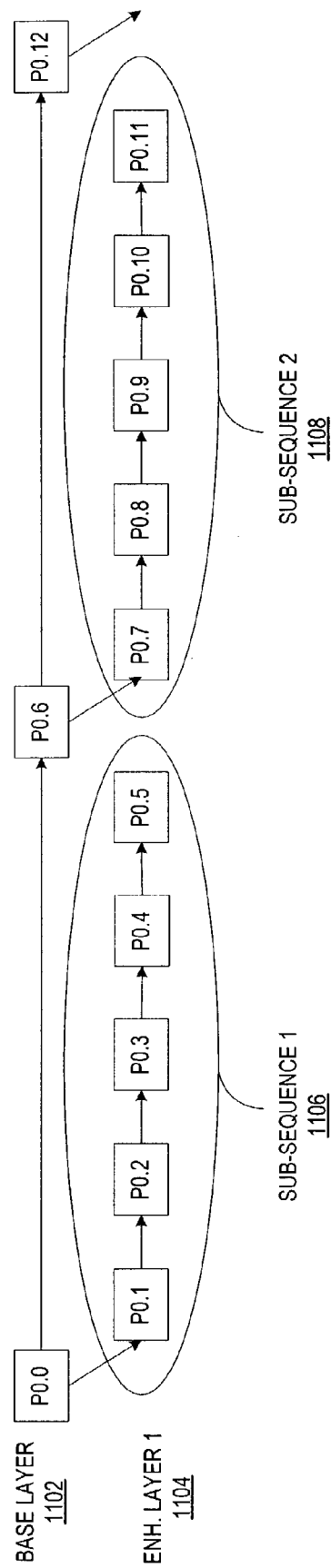
FIG. 11 illustrates an exemplary enhanced group of pictures (GOP)

FIG. 11 illustrates an exemplary enhanced GOP in which the samples are divided into two layers, a base layer 1102 and an enhancement layer 1104, and two sub-sequences 1106 and 1108. Each of the two sub-sequences 1106 and 1108 can be dropped independently of each other.

Figure 12:
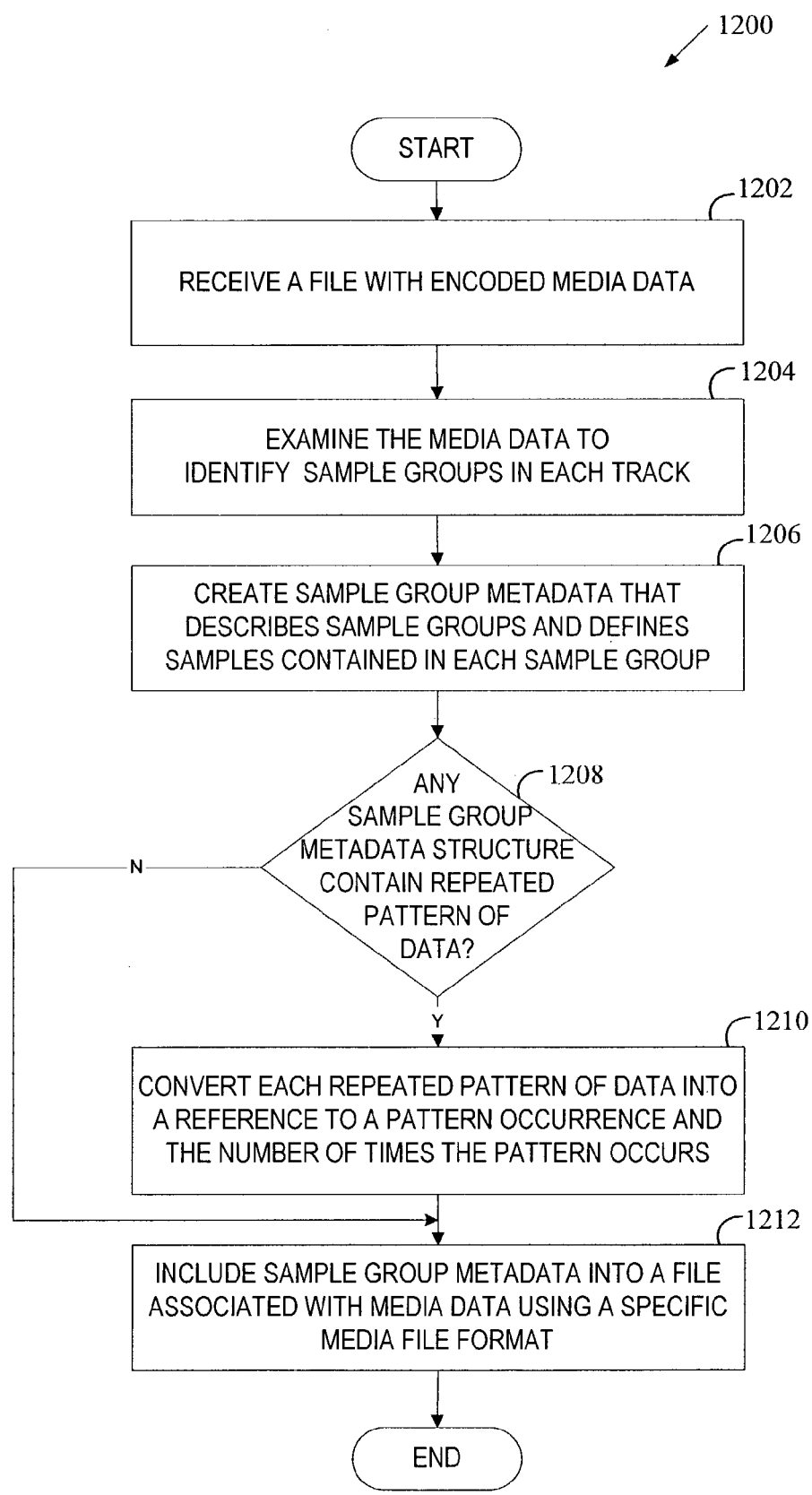
FIG. 12 is a flow diagram of a method for storing sequences metadata at an encoding system.
Figure 13:
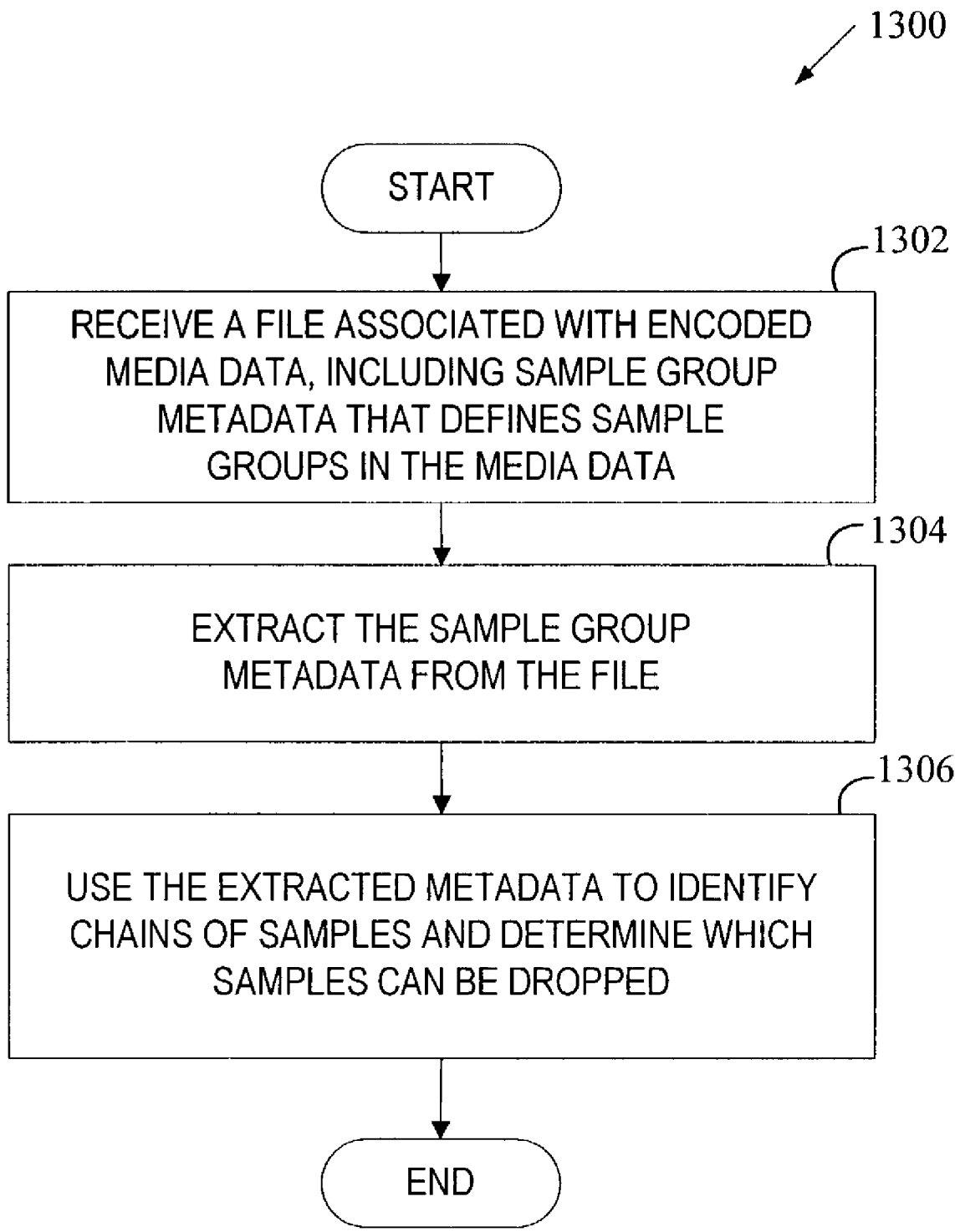
FIG. 13 is a flow diagram of a method for utilizing sequences metadata at a decoding system.

FIGS. 12 and 13 illustrate processes for storing and retrieving sample group metadata that are performed by the encoding system 100 and the decoding system 200 respectively. The processes may be performed by processing logic that may comprise hardware (e.g., circuitry, dedicated logic, etc.), software (such as run on a general purpose computer system or a dedicated machine), or a combination of both.

FIG. 12 is a flow diagram of one embodiment of a method 1200 for creating sample group metadata at the encoding system 100. Initially, method 1200 begins with processing logic receiving a file with encoded media data (processing block 1202). Samples within a track of the media data have certain inter-dependencies. For example, the track may include I-frames that do not depend on any other samples, P-frames that depend on a single prior sample, and B-frames that depend on two prior samples including any combination of I-frames, P-frames and B-frames. Based on their inter-dependencies, samples in a track can be logically combined into sample groups (e.g., enhanced GOPs, layers, sub-sequences, etc.).

Next, processing logic examines the media data to identify sample groups in each track (processing block 1204) and creates sample group metadata that describes the sample groups and defines which samples are contained in each sample group (processing block 1206). In one embodiment, the sample group metadata is organized into a set of predefined data structures (e.g., a set of boxes). The set of predefined data structures may include a data structure containing descriptive information about each sample group and a data structure containing information that identifies samples contained in each sample group.

Next, in one embodiment, processing logic determines whether any sample group data structure contains a repeated sequence of data (decision box 1208). If this determination is positive, processing logic converts each repeated sequence of data into a reference to a sequence occurrence and the number of times the sequence occurs (processing block 1210).

Afterwards, at processing block 1212, processing logic includes the sample group metadata into a file associated with media data using a specific media file format (e.g., the JVT file format). Depending on the media file format, the sample group metadata may be stored with sample metadata (e.g., the sample group data structures may be included in a sample table box) or independently from the sample metadata.

FIG. 13 is a flow diagram of one embodiment of a method 1300 for utilizing sample group metadata at the decoding system 200. Initially, method 1300 begins with processing logic receiving a file associated with encoded media data (processing block 1302). The file may be received from a database (local or external), the encoding system 100, or from any other device on a network. The file includes sample group metadata that defines sample groups in the media data.

Next, processing logic extracts the sample group metadata from the file (processing block 1304). As discussed above, the sample group metadata may be stored in a set of data structures (e.g., a set of boxes).

Further, at processing block 1306, processing logic uses the extracted sample group metadata to identify chains of samples that can be disposed of without affecting the ability to decode other samples. In one embodiment, this information may be used to access samples in a specific sample group and determine which samples can be dropped in response to a change in network capacity. In other embodiments, sample group metadata is used to filter samples so that only a portion of the samples in a track are processed or rendered.

Accordingly, the sample group metadata facilitates selective access to samples and scalability.

Exemplary sample group metadata structures will now be described with reference to an extended ISO media file format (referred to as an extended MP4). It should be noted, however, that other media file formats can be extended to incorporate various data structures for storing sample group metadata.

FIGS. 14A-14E illustrate exemplary data structures for storing sample group metadata.

Figure 14A:
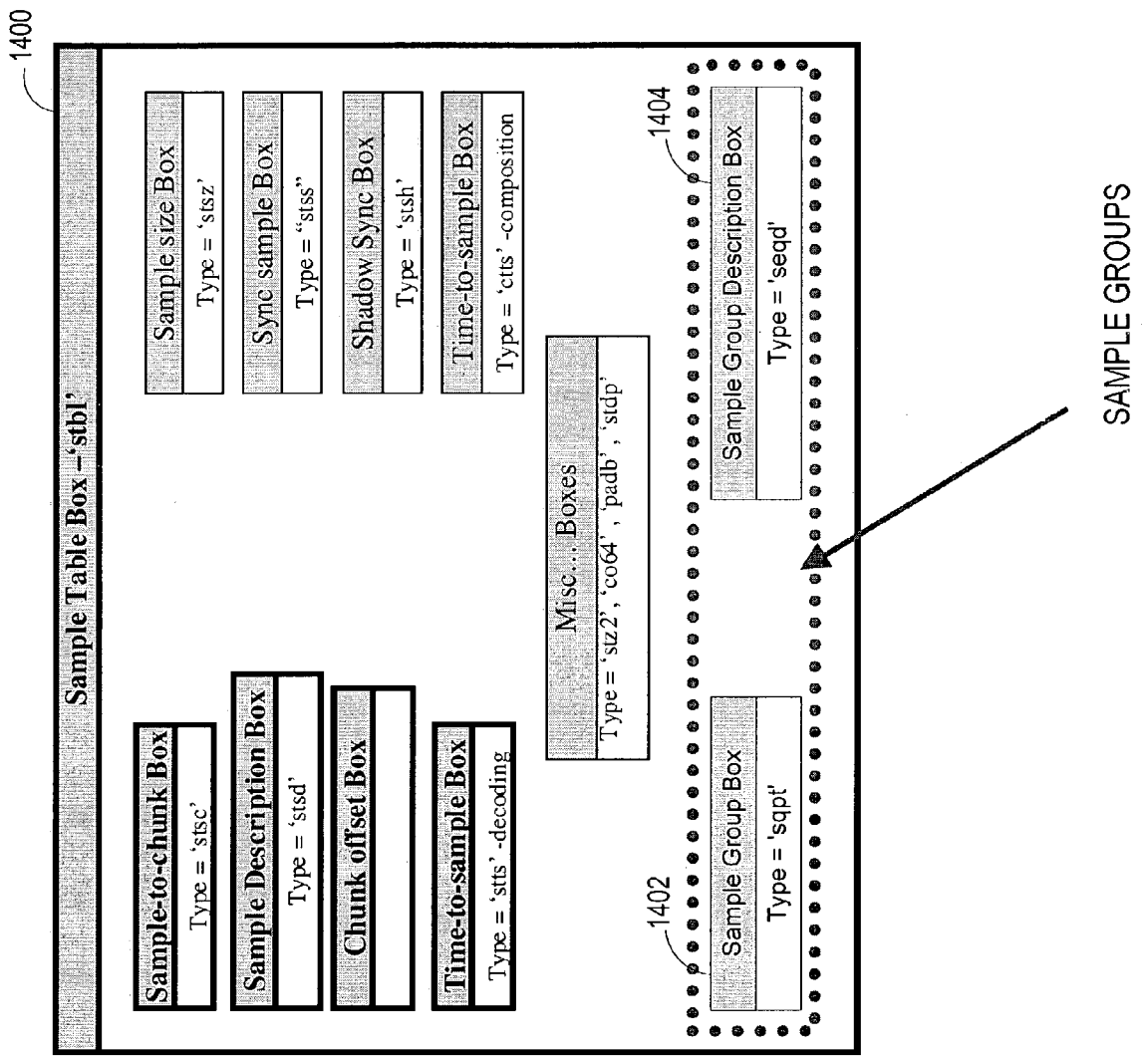

Referring to FIG. 14A, a sample table box 1400 that contains sample metadata boxes defined by MP4 is extended to include a sample group box 1402 and a sample group description box 1404. In one embodiment, the sample group metadata boxes 1402 and 1404 are optional.

Figure 14B:
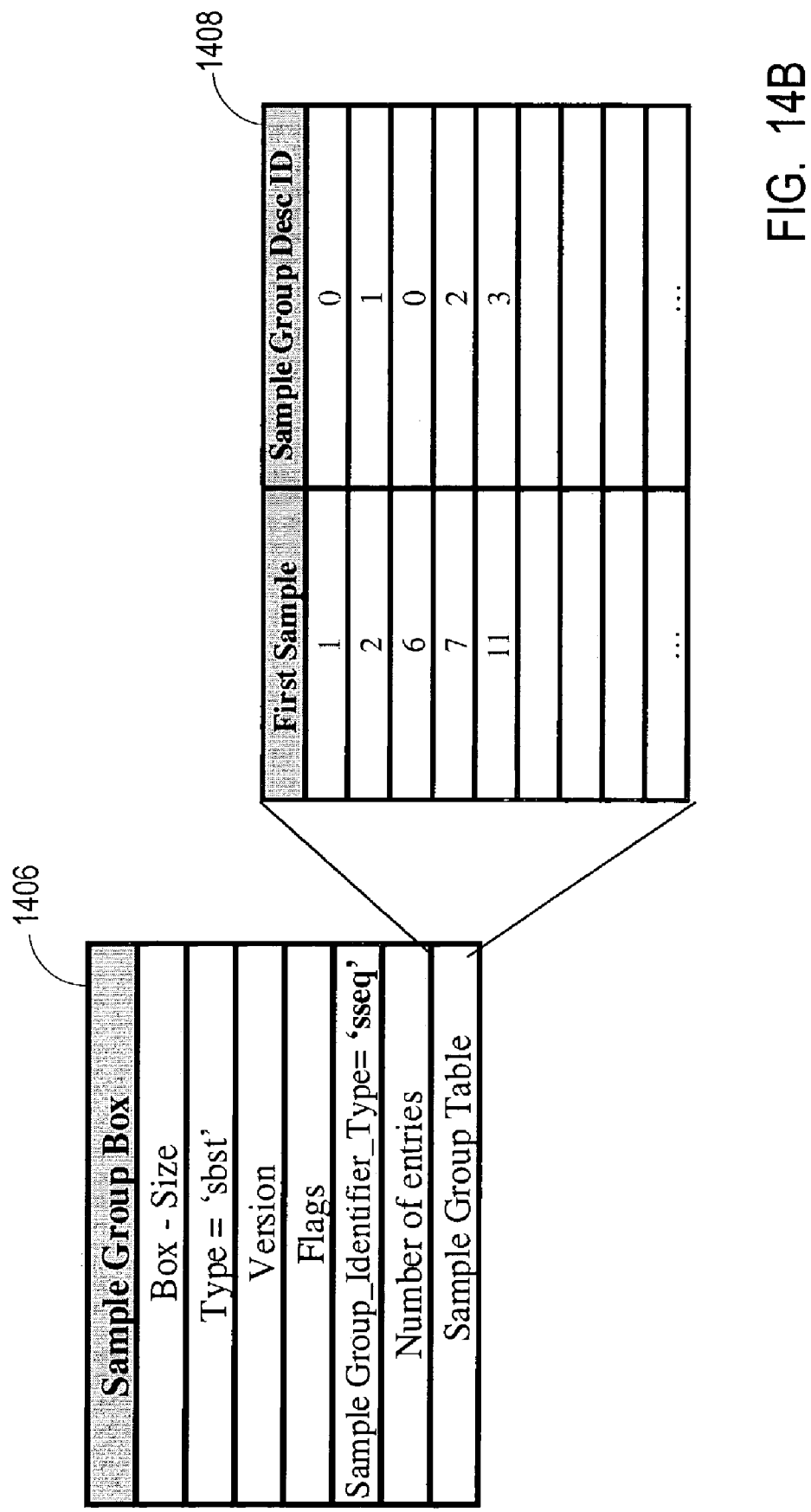

Referring to FIG. 14B, a sample group box 1406 is used to find a set of samples contained in a particular sample group. Multiple instances of the sample group box 1406 are allowed to correspond to different types of sample groups (e.g., enhanced GOPs, sub-sequences, layers, parameter sets, etc.). The sample group box 1406 contains a version field that specifies the version of the sample group box 1406, an entry count field to provide the number of entries in a table 1408, a sample group identifier field to identify the type of the sample group, a first sample field providing the index of a first sample in a run of samples that are contained in the same sample group, and a sample group description index specifying the index to a sample group description box.

Figure 14C:
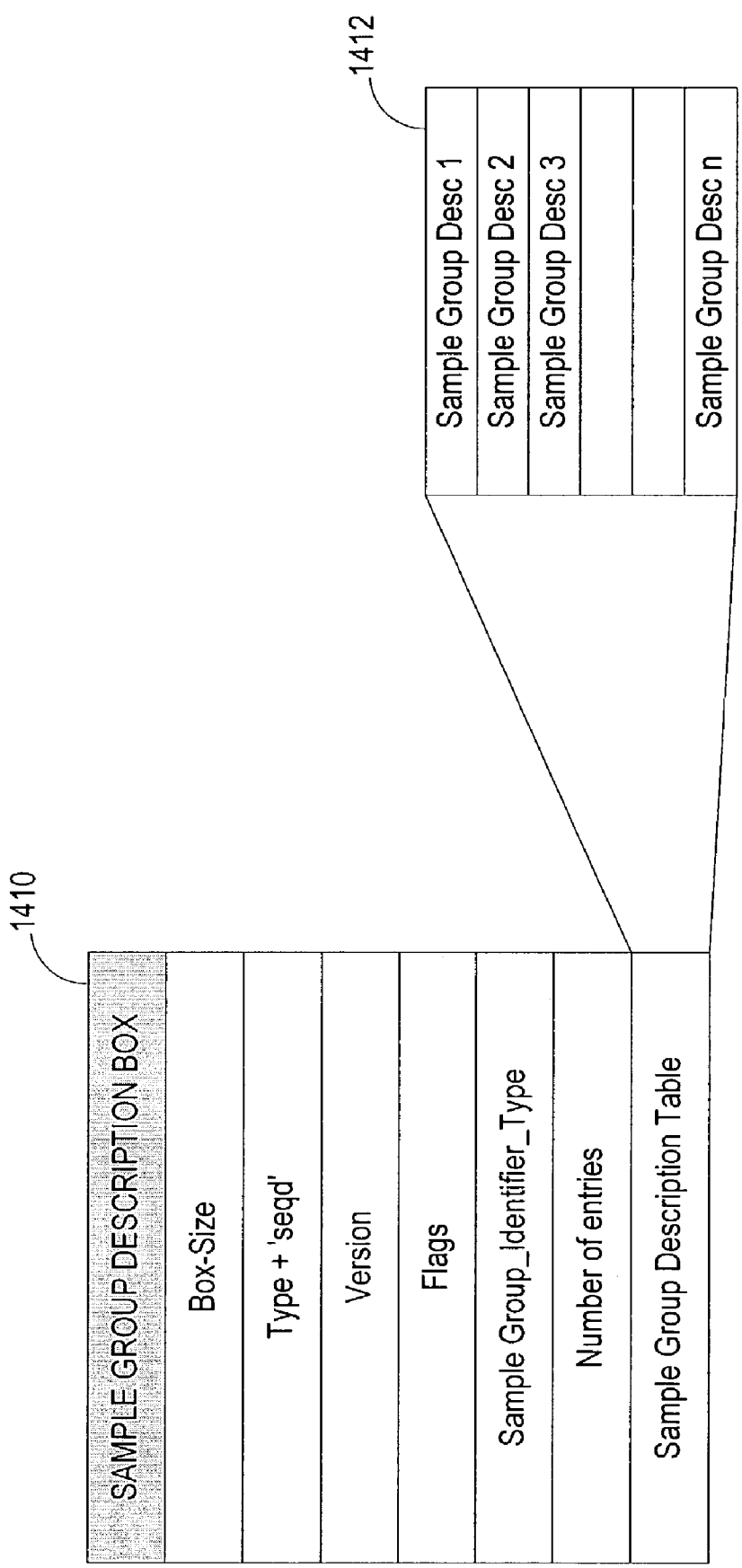

Referring to FIG. 14C, a sample group description box 1410 provides information about the characteristics of a sample group. The sample group description box 1410 contains a version field that specifies the version of the sample group description box 1410, an entry count field to provide the number of entries in a table 1412, a sample group identifier field to identify the type of the sample group, and a sample group description field to provide sample group descriptors.

Figure 14D:
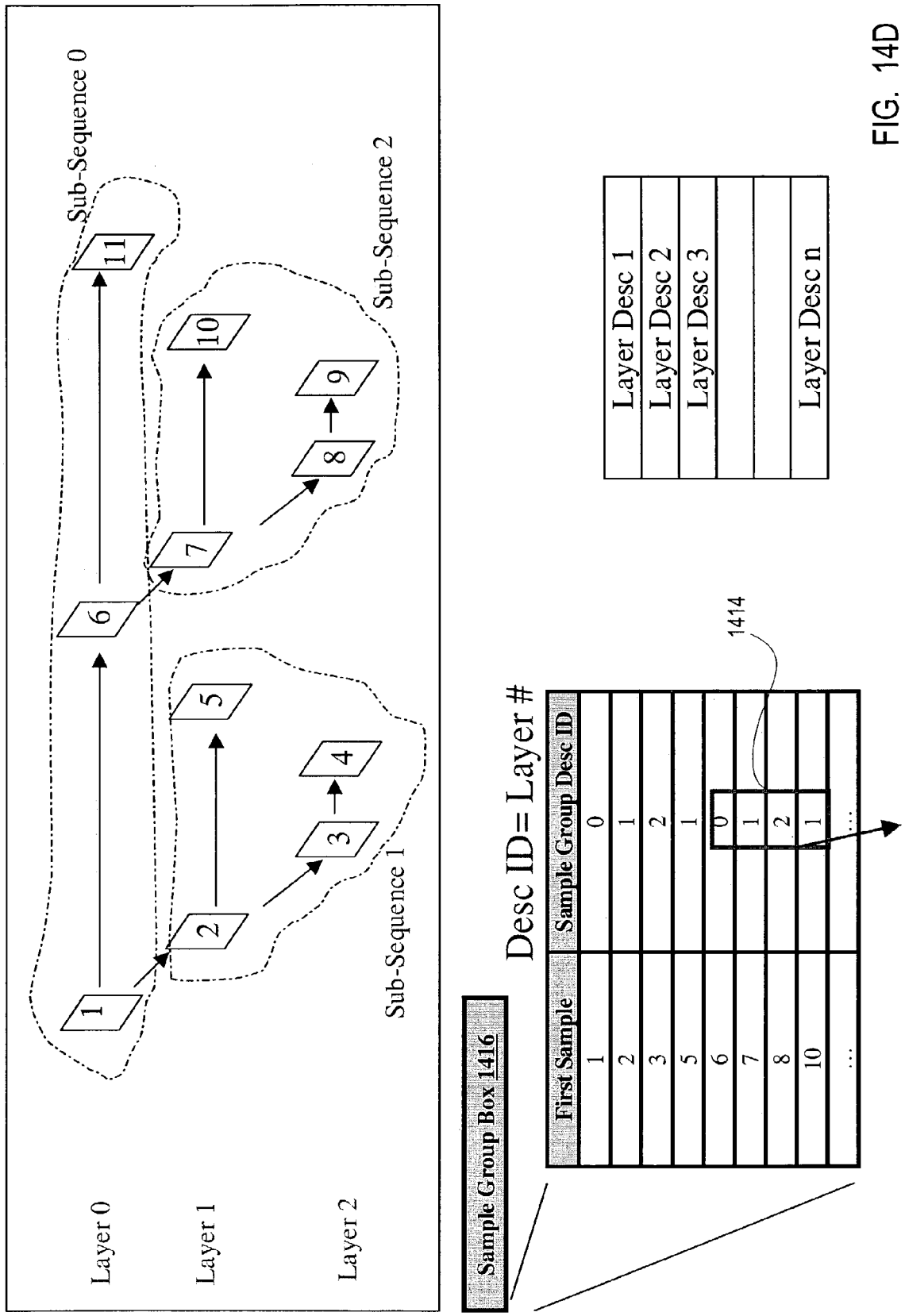

Referring to FIG. 14D, the use of the sample group box 1416 for the layers ("layr") sample group type is illustrated. Samples 1 through 11 are divided into three layers based on the samples' inter-dependencies. In layer 0 (the base layer), samples (samples 1, 6 and 11) depend only on each other but not on samples in any other layers. In layer 1, samples (samples 2, 5, 7, 10) depend on samples in the lower layer (i.e., layer 0) and samples within this layer 1. In layer 2, samples (samples 3, 4, 8, 9) depend on samples in lower layers (layers 0 and 1) and samples within this layer 2. Accordingly, the samples of layer 2 can be disposed of without affecting the ability to decode samples from lower layers 0 and 1.

Data in the sample group box 1416 illustrates the above associations between the samples and the layers. As shown, this data includes a repetitive layer pattern 1414 which can be compressed by converting each repeated layer pattern into a reference to an initial layer pattern and the number of times this pattern occurs, as discussed in more detail above.

Referring to FIG. 14E, the use of a sample group box 1418 for the sub-sequence ("sseq") sample group type is illustrated. Samples 1 through 11 are divided into four sub-sequences based on the samples' inter-dependencies. Each sub-sequence, except sub-sequence 0 at layer 0, includes samples on which no other sub-sequences depend. Thus, the samples in the sub-sequence can be disposed of as a unit when needed.

Data in the sample group box 1418 illustrates associations between the samples and the sub-sequences. This data allows random access to samples at the beginning of a corresponding sub-sequence.

Stream Switching

In typical streaming scenarios, one of the key requirements is to scale the bit rate of the compressed data in response to changing network conditions. The simplest way to achieve this is to encode multiple streams with different bit-rates and quality settings for representative network conditions. The server can then switch amongst these pre-coded streams in response to network conditions.

The JVT standard provides a new type of picture, called switching pictures that allow one picture to reconstruct identically to another without requiring the two pictures to use the same frame for prediction. In particular, JVT provides two types of switching pictures: SI-pictures, which, like I-frames, are coded independent of any other pictures; and SP-pictures, which are coded with reference to other pictures. Switching pictures can be used to implement switching amongst streams with different bit-rates and quality setting in response to changing delivery conditions, to provide error resilience, and to implement trick modes like fast forward and rewind.

However, to use JVT switching pictures effectively when implementing stream switching, error resilience, trick modes, and other features, the player has to know which samples in the stored media data have the alternate representations and what their dependencies are. Existing file formats do not provide such capability.

Figure 15A:
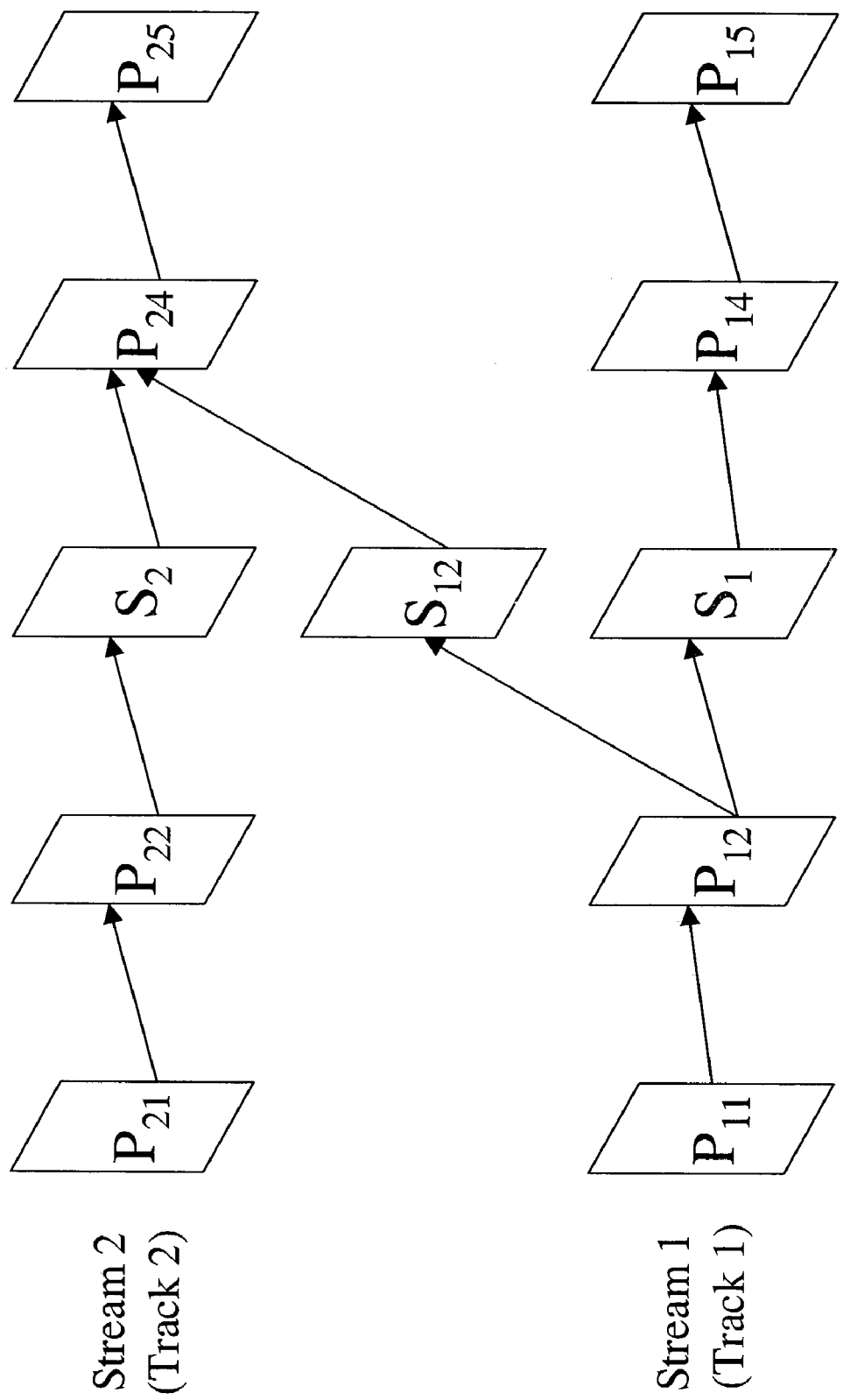

One embodiment of the present invention addresses the above limitation by defining switch sample sets. A switch sample set represents a set of samples whose decoded values are identical but which may use different reference samples. A reference sample is a sample used to predict the value of another sample. Each member of a switch sample set is referred to as a switch sample. FIG. 15A illustrate the use of a switch sample set for bit stream switching.

Referring to FIG. 15A, stream 1 and stream 2 are two encodings of the same content with different quality and bit-rate parameters. Sample S12 is a SP-picture, not occurring in either stream, that is used to implement switching from stream 1 to stream 2 (switching is a directional property). Samples S12 and S2 are contained in a switch sample set. Both S1 and S12 are predicted from sample P12 in track 1 and S2 is predicted from sample P22 in track 2. Although samples S12 and S2 use different reference samples, their decoded values are identical. Accordingly, switching from stream 1 to stream 2 (at sample S1 in stream 1 and S2 in stream 2) can be achieved via switch sample S12.

Figure 16:
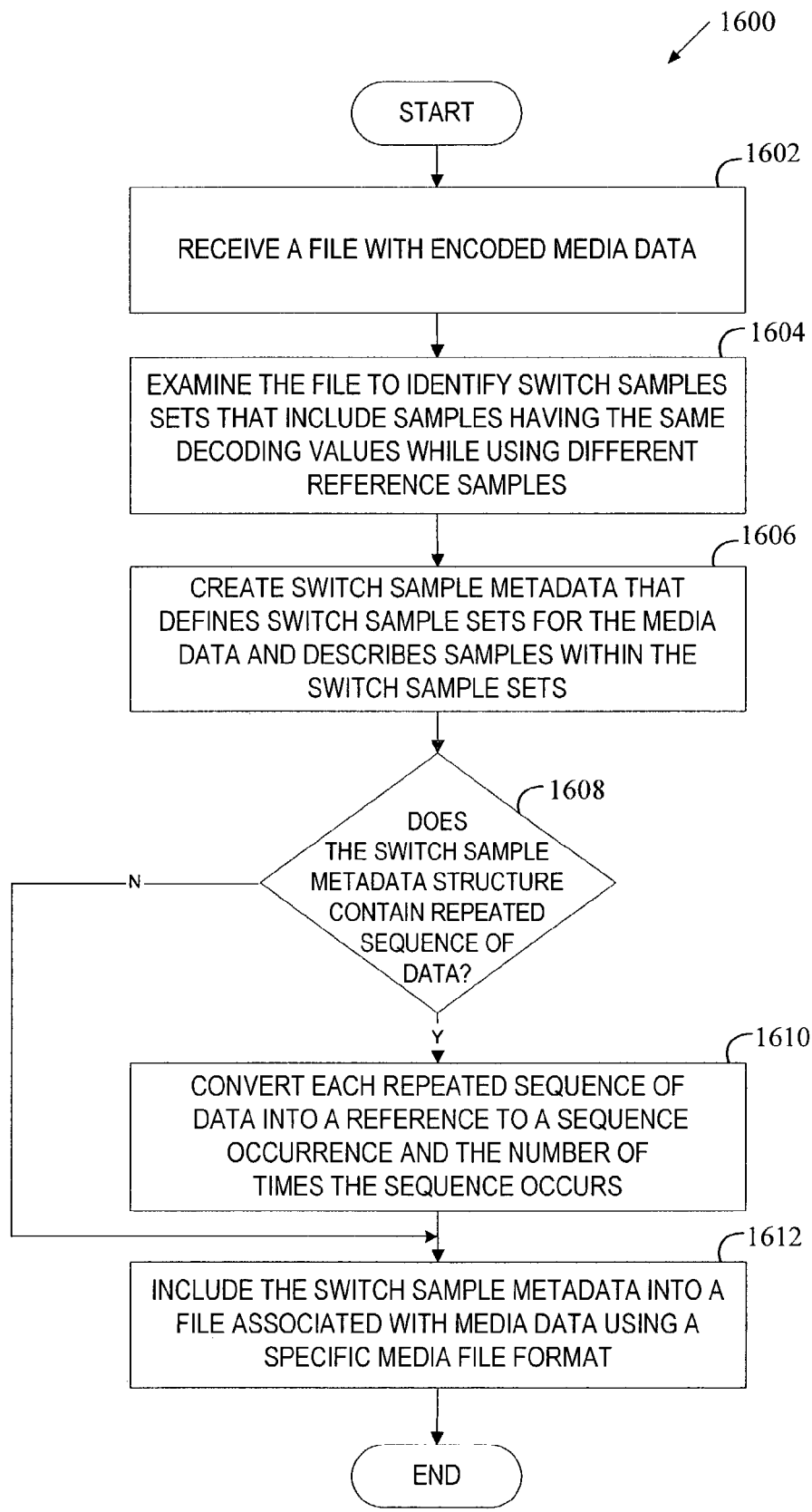
FIG. 16 is a flow diagram of a method for storing switch sample metadata at an encoding system.
Figure 17:
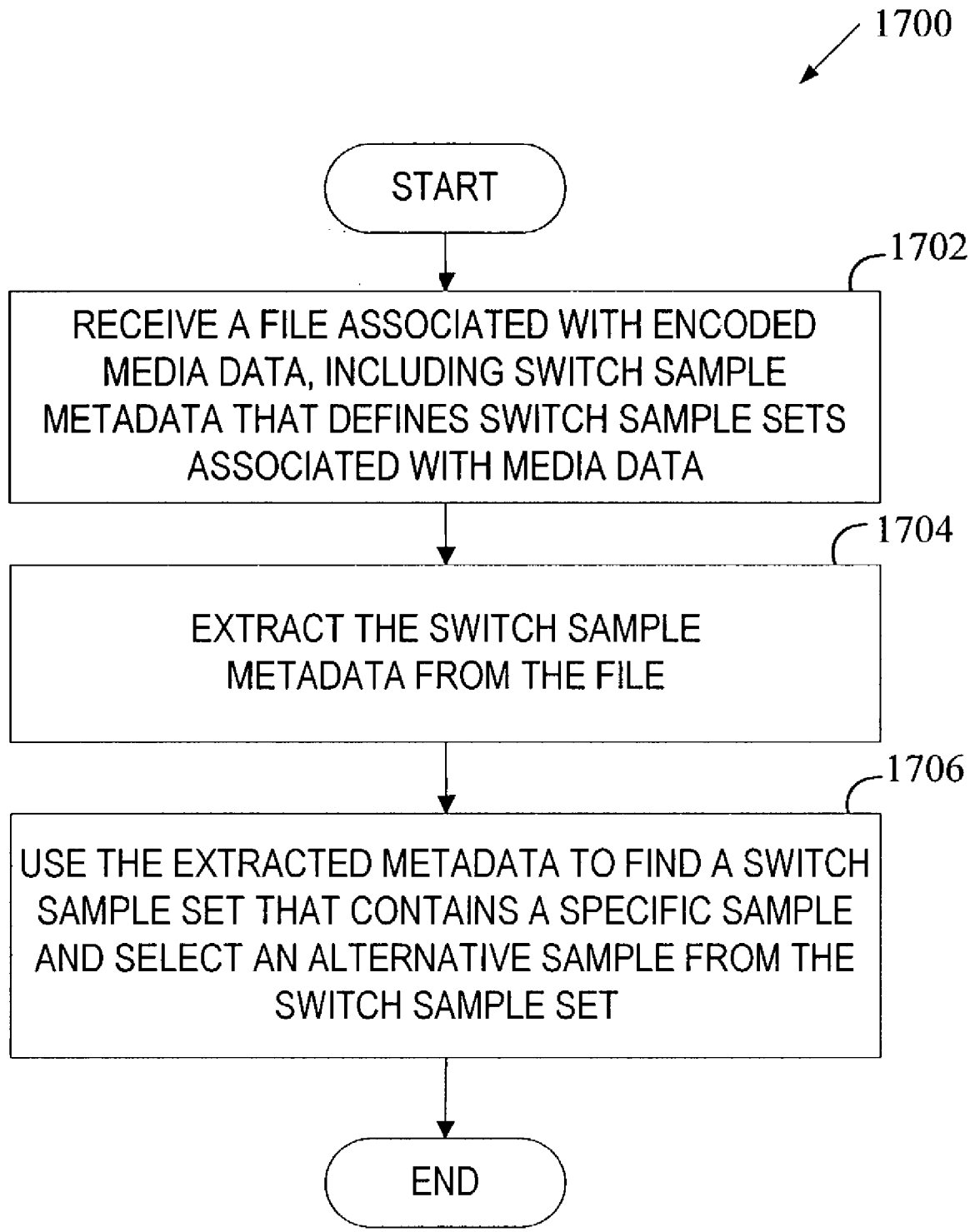
FIG. 17 is a flow diagram of a method for utilizing switch sample metadata at a decoding system.

FIGS. 16 and 17 illustrate processes for storing and retrieving switch sample metadata that are performed by the encoding system 100 and the decoding system 200 respectively. The processes may be performed by processing logic that may comprise hardware (e.g., circuitry, dedicated logic, etc.), software (such as run on a general purpose computer system or a dedicated machine), or a combination of both.

FIG. 16 is a flow diagram of one embodiment of a method 1600 for creating switch sample metadata at the encoding system 100. Initially, method 1600 begins with processing logic receiving a file with encoded media data (processing block 1602). The file includes one or more alternate encodings for the media data (e.g., for different bandwidth and quality settings for representative network conditions). The alternate encodings includes one or more switching pictures. Such pictures may be included inside the alternate media data streams or as separate entities that implement special features such as error resilience or trick modes. The method for creating these tracks and switch pictures is not specified by this invention but various possibilities would be obvious to one versed in the art. For example, the periodic (e.g., every 1 second) placement of switch samples between each pair of tracks containing alternate encodings.

Next, processing logic examines the file to create switch sample sets that include those samples having the same decoding values while using different reference samples (processing block 1604) and creates switch sample metadata that defines switch sample sets for the media data and describes samples within the switch sample sets (processing block 1606). In one embodiment, the switch sample metadata is organized into a predefined data structure such as a table box containing a set of nested tables.

Next, in one embodiment, processing logic determines whether the switch sample metadata structure contains a repeated sequence of data (decision box 1608). If this determination is positive, processing logic converts each repeated sequence of data into a reference to a sequence occurrence and the number of times the sequence occurs (processing block 1610).

Afterwards, at processing block 1612, processing logic includes the switch sample metadata into a file associated with media data using a specific media file format (e.g., the JVT file format). In one embodiment, the switch sample metadata may be stored in a separate track designated for stream switching. In another embodiment, the switch sample metadata is stored with sample metadata (e.g., the sequences data structures may be included in a sample table box).

FIG. 17 is a flow diagram of one embodiment of a method 1700 for utilizing switch sample metadata at the decoding system 200. Initially, method 1700 begins with processing logic receiving a file associated with encoded media data (processing block 1702). The file may be received from a database (local or external), the encoding system 100, or from any other device on a network. The file includes switch sample metadata that defines switch sample sets associated with the media data.

Next, processing logic extracts the switch sample metadata from the file (processing block 1704). As discussed above, the switch sample metadata may be stored in a data structure such as a table box containing a set of nested tables.

Further, at processing block 1706, processing logic uses the extracted metadata to find a switch sample set that contains a specific sample and select an alternative sample from the switch sample set. The alternative sample, which has the same decoding value as the initial sample, may then be used to switch between two differently encoded bit streams in response to changing network conditions, to provide random access entry point into a bit stream, to facilitate error recovery, etc.

An exemplary switch sample metadata structure will now be described with reference to an extended ISO media file format (referred to as an extended MP4). It should be noted, however, that other media file formats could be extended to incorporate various data structures for storing switch sample metadata.

Figure 18:
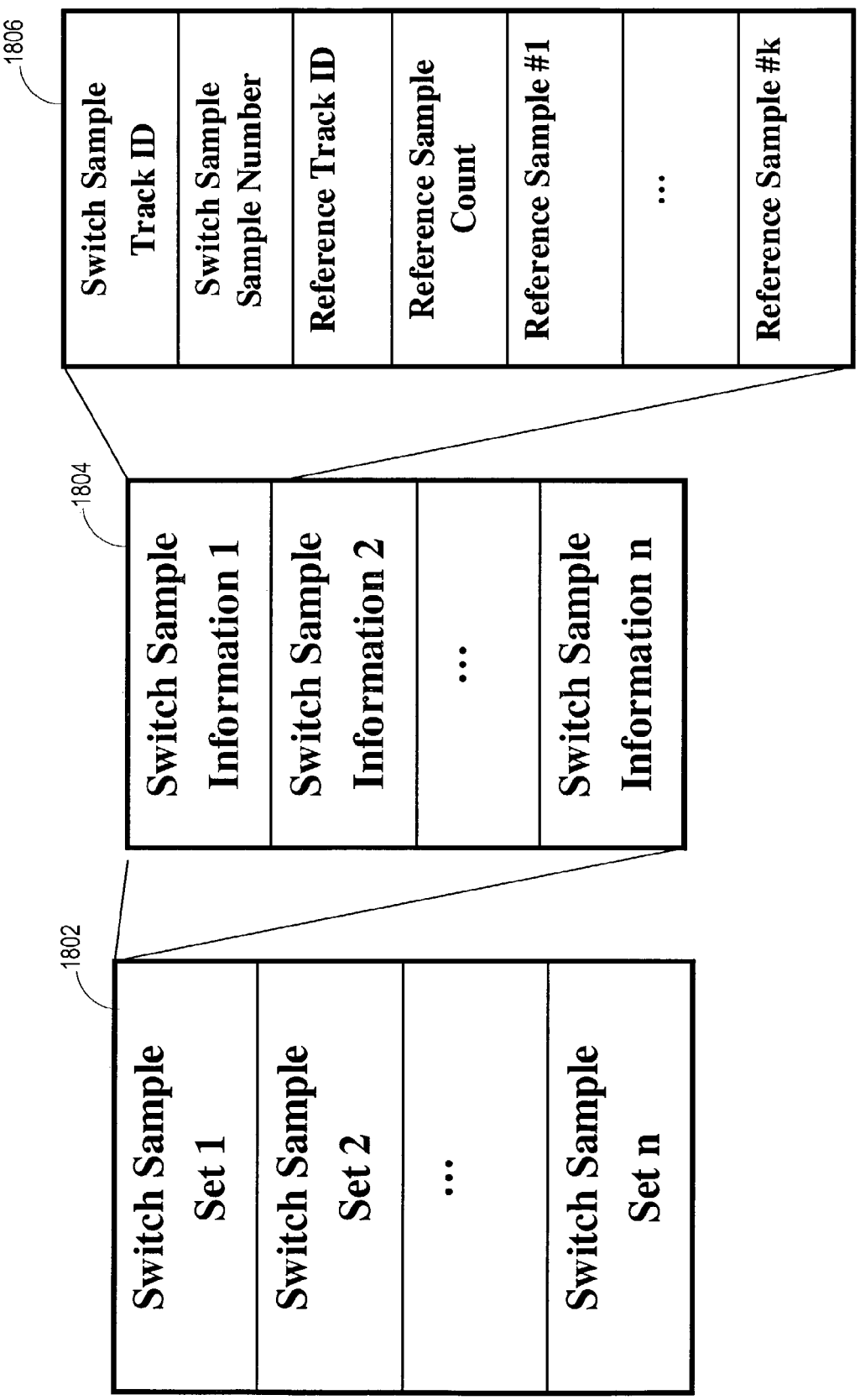
FIG. 18 illustrates an exemplary data structure for storing switch sample metadata.

FIG. 18 illustrates an exemplary data structure for storing switch sample metadata. The exemplary data structure is in the form of a switch sample table box that includes a set of nested tables. Each entry in a table 1802 identifies one switch sample set. Each switch sample set consists of a group of switch samples whose reconstruction is objectively identical (or perceptually identical) but which may be predicted from different reference samples that may or may not be in the same track (stream) as the switch sample. Each entry in the table 1802 is linked to a corresponding table 1804. The table 1804 identifies each switch sample contained in a switch sample set. Each entry in the table 1804 is further linked to a corresponding table 1806 which defines the location of a switch sample (i.e., its track and sample number), the track containing reference samples used by the switch sample, the total number of reference samples used by the switch sample, and each reference sample used by the switch sample.

As illustrated in FIG. 15A, in one embodiment, the switch sample metadata may be used to switch between differently encoded versions of the same content. In MP4, each alternate coding is stored as a separate MP4 track and the "alternate group" in the track header indicates that it is an alternate encoding of specific content.

FIG. 15B illustrates a table containing metadata that defines a switch sample set 1502 consisting of samples S2 and S12 according to FIG. 15A.

Figure 15C:
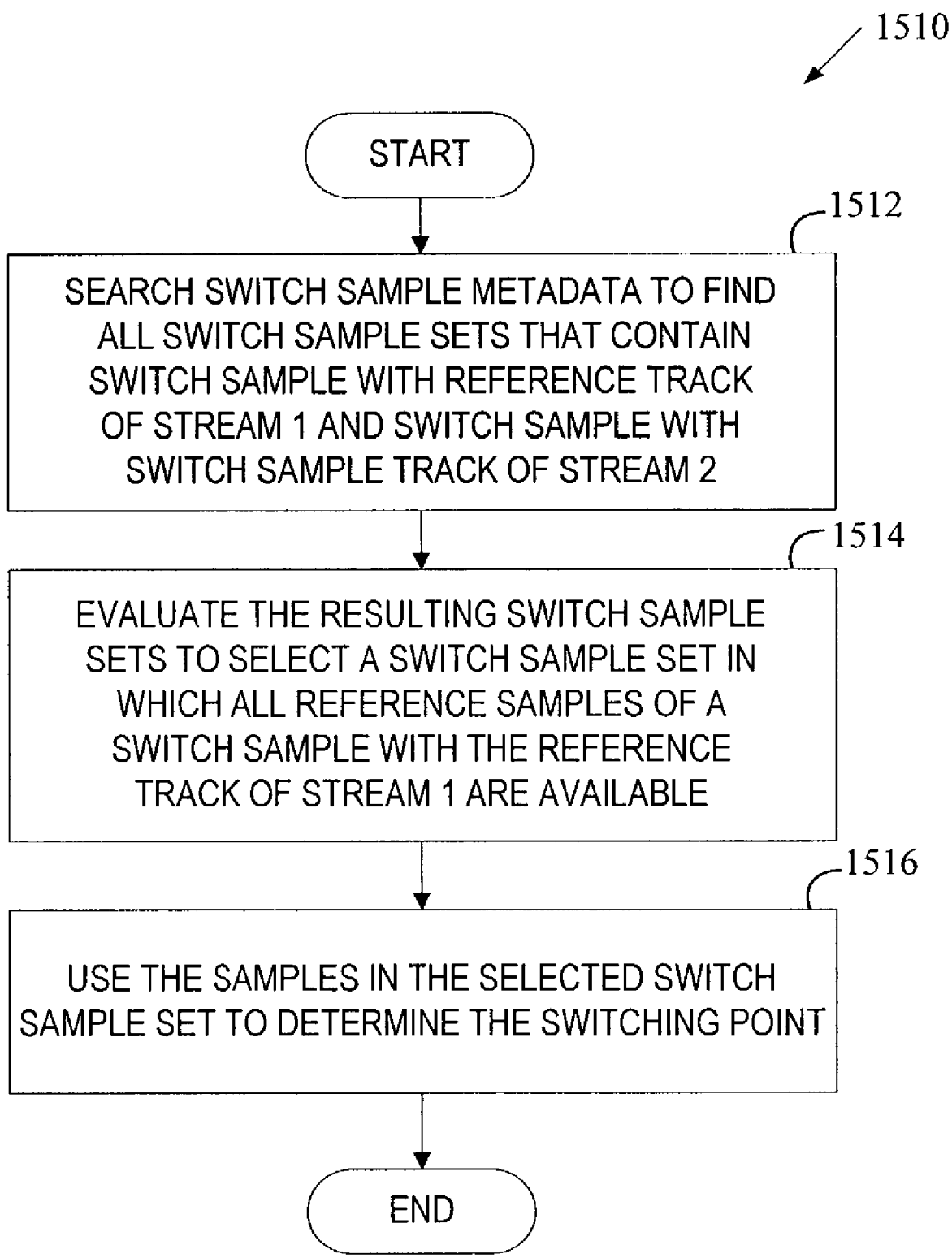
FIG. 15C is a flow diagram of one embodiment of a method for determining a point at which a switch between two bit streams is to be performed.

FIG. 15C is a flow diagram of one embodiment of a method 1510 for determining a point at which a switch between two bit streams is to be performed. Assuming that the switch is to be performed from stream 1 to stream 2, method 1510 begins with searching switch sample metadata to find all switch sample sets that contain a switch sample with a reference track of stream 1 and a switch sample with a switch sample track of stream 2 (processing block 1512). Next, the resulting switch sample sets are evaluated to select a switch sample set in which all reference samples of a switch sample with the reference track of stream 1 are available (processing block 1514). For example, if the switch sample with the reference track of stream 1 is a P frame, one sample before switching is required to be available. Further, the samples in the selected switch sample set are used to determine the switching point (processing block 1516). That is, the switching point is considered to be immediately after the highest reference sample of the switch sample with the reference track of stream 1, via the switch sample with the reference track of stream 1, and to the sample immediately following the switch sample with the switch sample track of stream 2.

Figure 19A:
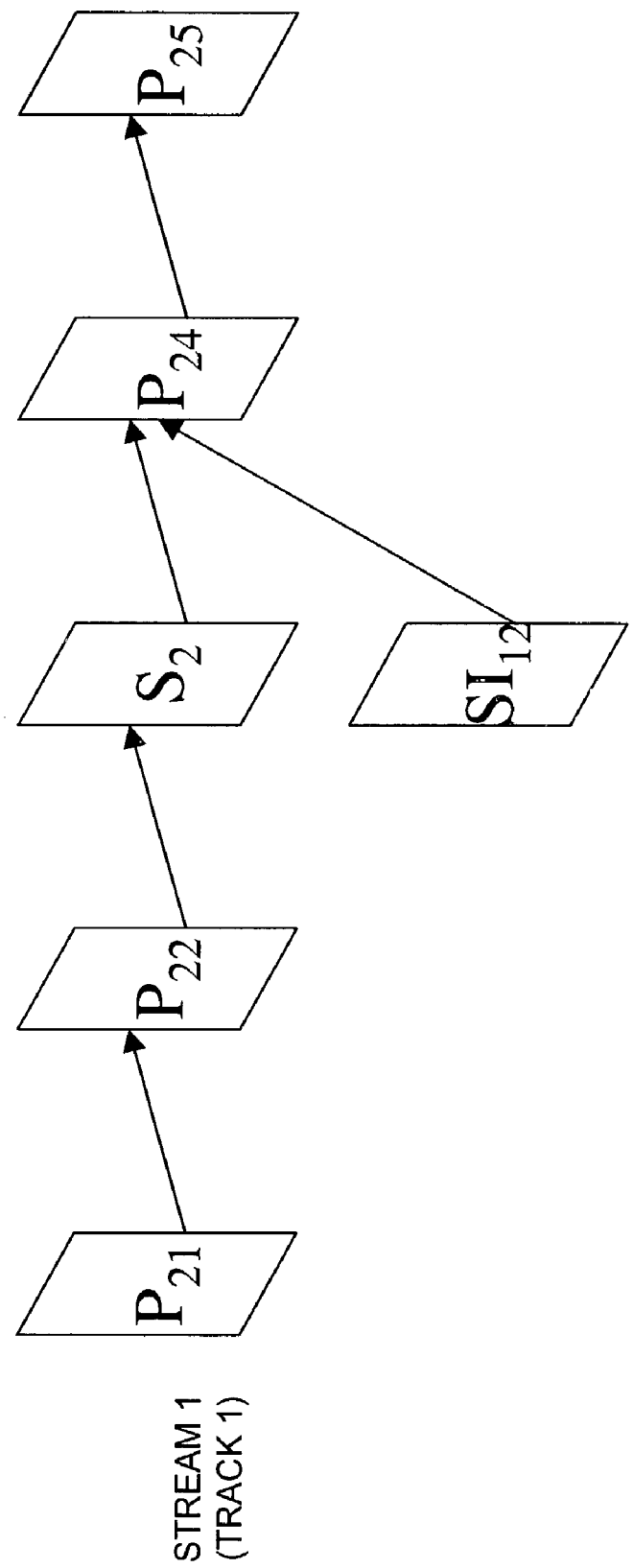
Figure 19C:
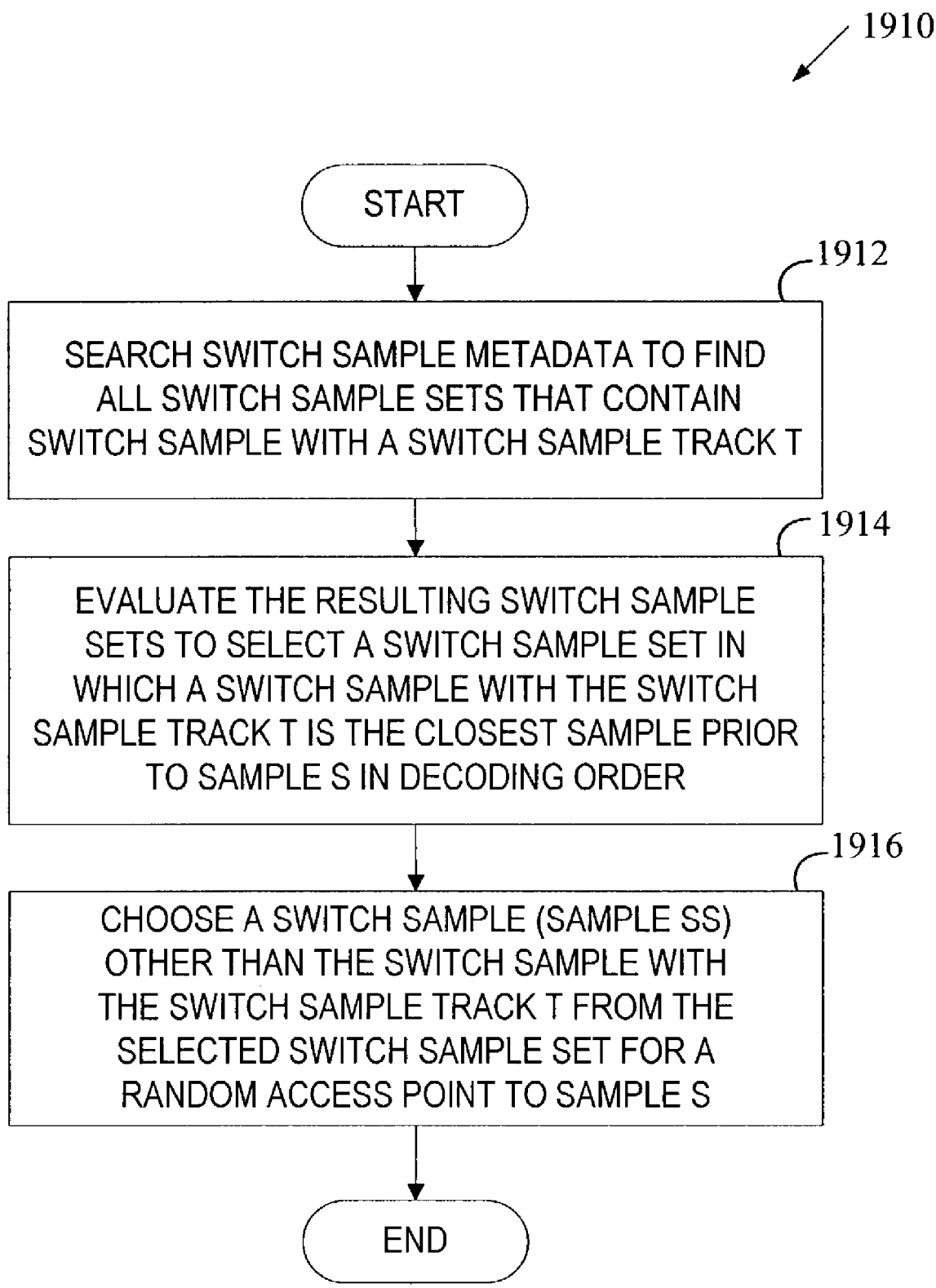
FIG. 19C is a flow diagram of one embodiment of a method for determining a random access point for a sample.

In another embodiment, switch sample metadata may be used to facilitate random access entry points into a bit stream as illustrated in FIGS. 19A-19C.

Referring to FIGS. 19A and 19B, a switch sample 1902 consists of samples S2 and S12. S2 is a P-frame predicted from P22 and used during usual stream playback. S12 is used as a random access point (e.g., for splicing). Once S12 is decoded, stream playback continues with decoding of P24 as if P24 was decoded after S2.

FIG. 19C is a flow diagram of one embodiment of a method 1910 for determining a random access point for a sample (e.g., sample S on track T). Method 1910 begins with searching switch sample metadata to find all switch sample sets that contain a switch sample with a switch sample track T (processing block 1912). Next, the resulting switch sample sets are evaluated to select a switch sample set in which a switch sample with the switch sample track T is the closest sample prior to sample S in decoding order (processing block 1914). Further, a switch sample (sample SS) other than the switch sample with the switch sample track T is chosen from the selected switch sample set for a random access point to sample S (processing block 1916). During stream playback, sample SS is decoded (following by the decoding of any reference samples specified in the entry for sample SS) instead of sample S.

Figure 20A:
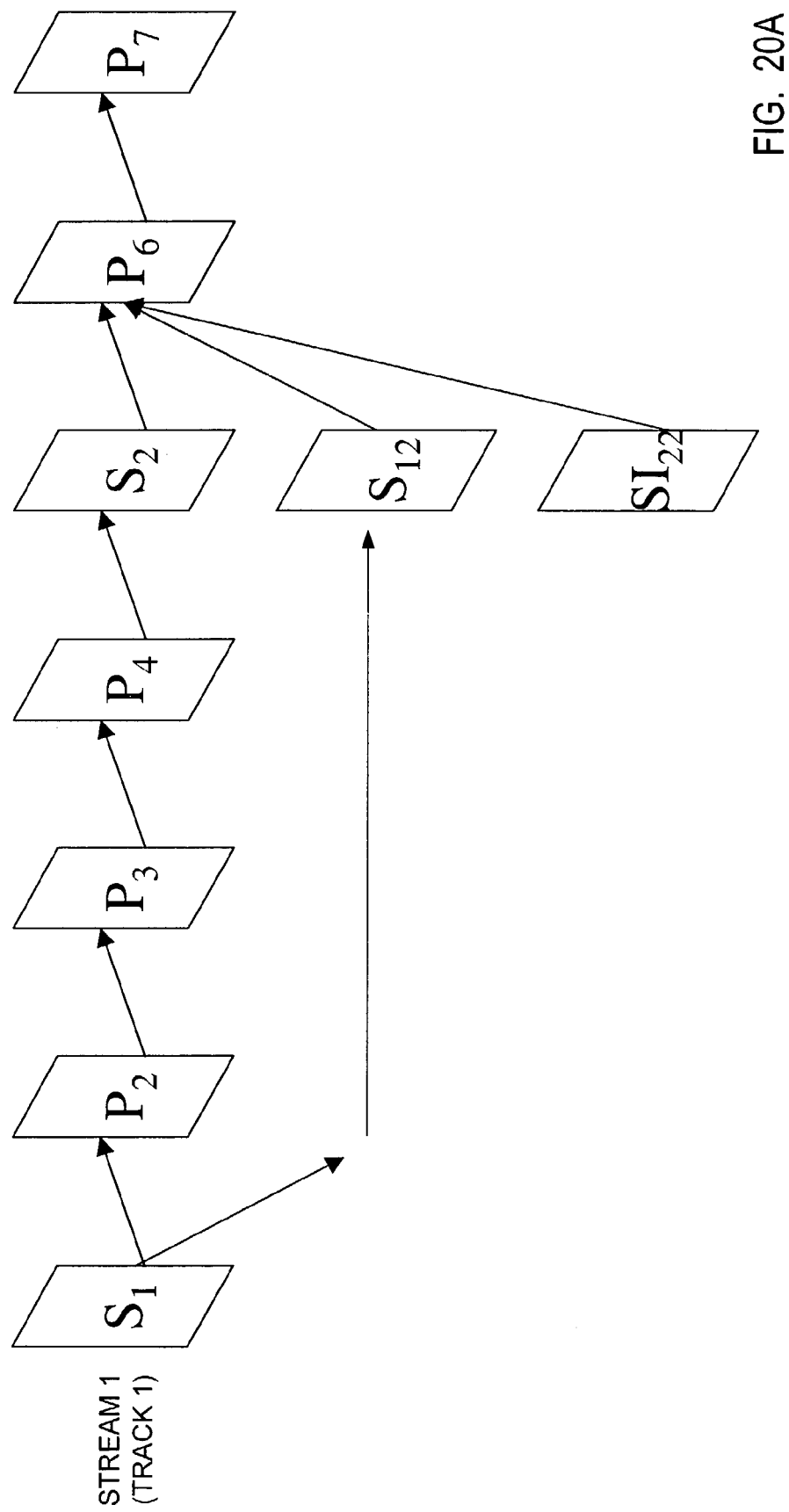
Figure 20C:
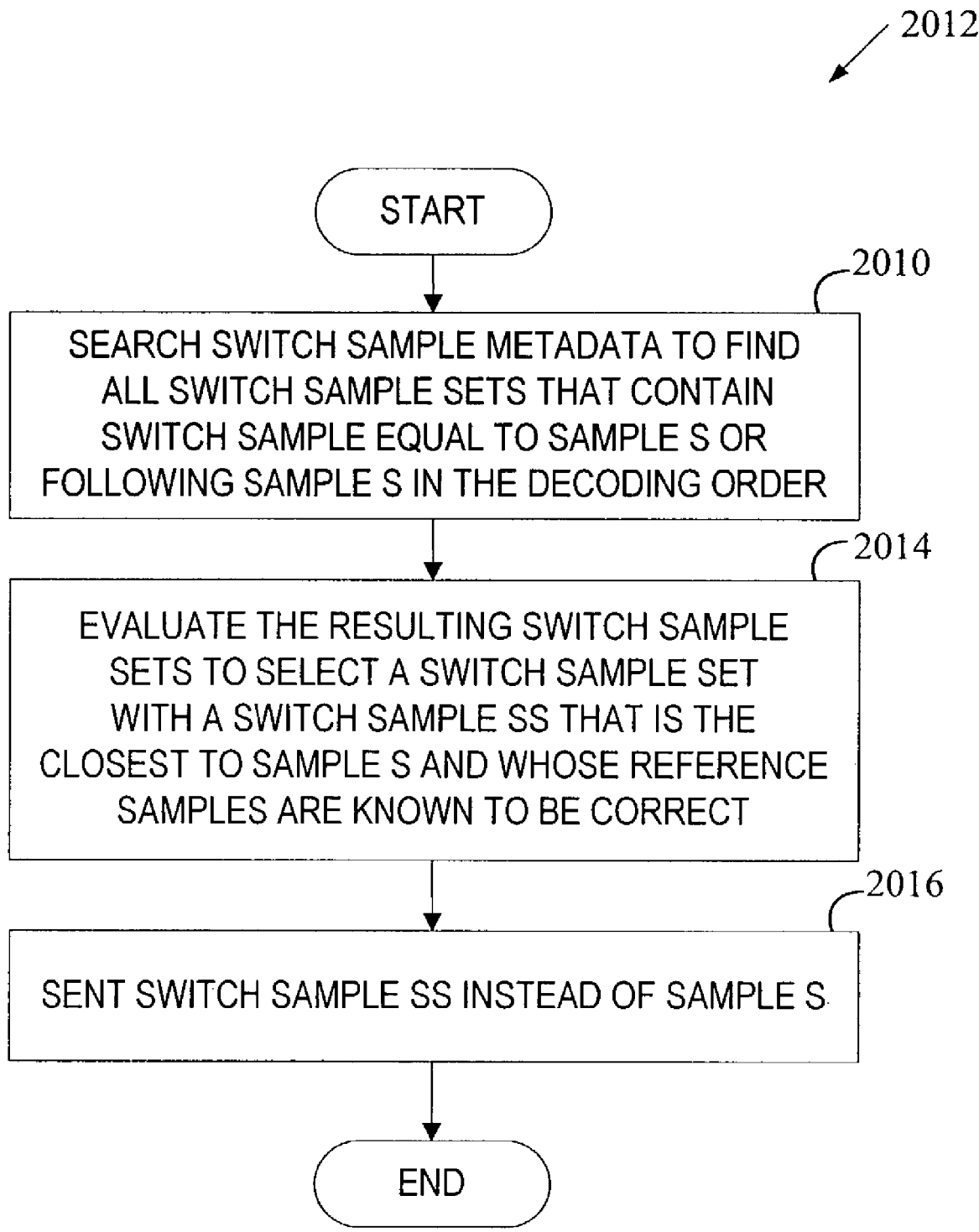
FIG. 20C is a flow diagram of one embodiment of a method for facilitating error recovery when sending a sample.

In yet another embodiment, switch sample metadata may be used to facilitate error recovery as illustrated in FIGS. 20A-20C.

Referring to FIGS. 20A and 20B, a switch sample 2002 consists of samples S2, S12 and S22. Sample S2 is predicted from sample P4. Sample S12 is predicted from sample S1. If an error occurs between samples P2 and P4, the switch sample S12 can be decoded instead of sample S2. Streaming then continues with sample P6 as usual. If an error affects sample S1 as well, switch sample S22 can be decoded instead of sample S2, and then streaming will continue with sample P6 as usual.

FIG. 20C is a flow diagram of one embodiment of a method 2010 for facilitating error recovery when sending a sample (e.g., sample S). Method 2010 begins with searching switch sample metadata to find all switch sample sets that contain a switch sample equal to sample S or following sample S in the decoding order (processing block 2012). Next, the resulting switch sample sets are evaluated to select a switch sample set with a switch sample SS that is the closest to sample S and whose reference samples are known (via feedback or some other information source) to be correct (processing block 2014). Further, switch sample SS is sent instead of sample S (processing block 2016).

Storage and retrieval of audiovisual metadata has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The invention claimed is:

1. A computerized method for creating metadata for multimedia data, the method comprising:
 receiving a file with encoded multimedia data;
 examining the encoded multimedia data to identify switch sample sets associated with the encoded multimedia data;
 identifying samples in the switch sample sets that have identical decoded values while using reference samples from different tracks;
 creating, by a computer including a processor, switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences; and
 forming a file associated with the encoded multimedia data, the formed file comprising the switch sample metadata, wherein when the formed file is received by a decoding system, the switch sample metadata instructs the decoding system on finding a replacement for a specific sample.

2. The method of claim 1 wherein the samples in each switch sample set of the plurality of switch sample sets use different reference samples.

3. The method of claim 1, wherein the predefined data structure is a table box containing a set of nested tables.

4. The method of claim 1 further comprising:
 sending a file associated with the encoded multimedia data to a decoding system;
 receiving the file associated with the encoded multimedia data at the decoding system; and
 extracting, at the decoding system, the switch sample metadata from the file associated with the encoded multimedia data, the extracted switch sample metadata being subsequently used to find a replacement for a specific sample.

5. A computerized method for creating metadata for multimedia data, the method comprising:
 receiving a file with encoded multimedia data;
 examining the encoded multimedia data to identify switch sample sets associated with the encoded multimedia data;
 identifying samples in the switch sample sets that have identical decoded values while using reference samples from different tracks;
 creating sub-sample metadata defining a plurality of sub-samples within each sample of the encoded multimedia data;
 creating parameter set metadata identifying one or more parameter sets for a plurality of portions of the encoded multimedia data;
 creating, by a computer including a processor, switch sample metadata defining a plurality of switch sample sets, each sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences; and
 forming a file associated with the encoded multimedia data, the formed file comprising the sub-sample metadata, the parameter set metadata, and the switch sample metadata, wherein when the formed file is received by a decoding system, the switch sample metadata instructs the decoding system on finding a replacement for a specific sample.

6. The method of claim 5 wherein the creating sub-sample metadata comprises:
 organizing the sub-sample metadata into a set of predefined data structures comprising a first data structure containing information about sub-sample sizes, a second data structure containing information about a number of sub-samples in each sample, and a third data structure containing information describing each sub-sample.

7. The method of claim 5 wherein each portion of the plurality of portions of multimedia data is any one of a sample and a sub-sample within the multimedia data.

8. The method of claim 5 wherein the creating parameter set metadata comprises:
 organizing the parameter set metadata into a set of predefined data structures comprising a first data structure containing descriptive information about the one or more parameter sets and a second data structure containing information that defines associations between the one or more parameter sets and the plurality of portions of multimedia data.

9. The method of claim 5 wherein the samples in each switch sample set of the plurality of switch sample sets use different reference samples.

10. The method of claim 5 wherein the predefined data structure is a table box containing a set of nested tables.

11. The method of claim 5 further comprising:
 sending a file associated with the encoded multimedia data to a decoding system;
 receiving the file associated with the encoded multimedia data at the decoding system; and extracting, at the decoding system, the sub-sample metadata, the parameter set metadata, and the switch sample metadata from the file associated with the encoded multimedia data.

12. A computerized method for creating metadata for multimedia data, the method comprising:
  receiving a file with encoded multimedia data;
  examining the encoded multimedia data to identify switch sample sets associated with the encoded multimedia data;
  identifying samples in the switch sample sets that have identical decoded values while using reference samples from different tracks;
  creating sub-sample metadata defining a plurality of sub-samples within each sample of multimedia data;
  creating, by a computer including a processor, switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences; and
  forming a file associated with the encoded multimedia data, the formed file comprising the sub-sample metadata and the switch sample metadata, wherein when the formed file is received by a decoding system, the switch sample metadata instructs a decoding system on finding a replacement for a specific sample.

13. The method of claim 12 wherein the creating sub-sample metadata comprises:
  organizing the sub-sample metadata into a set of predefined data structures comprising a first data structure containing information about sub-sample sizes, a second data structure containing information about a number of sub-samples in each sample, and a third data structure containing information describing each sub-sample.

14. The method of claim 12 wherein the samples in each switch sample set of the plurality of switch sample sets uses different reference samples.

15. The method of claim 12 wherein the creating switch sample metadata comprises: organizing the switch sample metadata into a predefined data structure represented as a table box containing a set of nested tables.

16. The method of claim 12 further comprising:
  sending a file associated with the encoded multimedia data to a decoding system;
  receiving the file associated with the encoded multimedia data at the decoding system; and
  extracting, at the decoding system, the sub-sample metadata and the switch sample metadata from the file associated with the encoded multimedia data.

17. An apparatus for creating metadata for multimedia data, the apparatus comprising:
  a memory to store the multimedia data;
  a processor coupled to the memory;
  a file creator to receive a file with encoded multimedia data, examine the encoded multimedia data to identify switch sample sets associated with the encoded multimedia data, and to identify samples in the switch sample sets that have identical decoded values while using reference samples from different tracks; and
  a metadata generator to create switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences, and
  the file creator further to form a file associated with the encoded multimedia data, the formed file comprising the switch sample metadata, wherein when the formed file is received by a decoding system, the switch sample metadata instructs the decoding system on finding a replacement for a specific sample.

18. The apparatus of claim 17 wherein the samples in each switch sample set of the plurality of switch sample sets use different reference samples.

19. The apparatus of claim 17 further comprising:
  a metadata extractor to receive the file associated with the encoded multimedia data at a decoding system and to extract the switch sample metadata from the file associated with the encoded multimedia data; and
  a media data stream processor to use the extracted switch sample metadata finding a replacement for a specific sample.

20. An apparatus for creating metadata for multimedia data, the apparatus comprising:
  a memory to store the multimedia data;
  a processor coupled to the memory;
  a file creator to receive a file with encoded multimedia data, examine the encoded multimedia data to identify switch sample sets associated with the encoded multimedia data, and to identify samples in the switch sample sets that have identical decoded values while using reference samples from different tracks; and
  a metadata generator to create sub-sample metadata defining a plurality of sub-samples within each sample of the multimedia data, to create parameter set metadata identifying one or more parameter sets for a plurality of portions of the encoded multimedia data, and to create switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences, and
  the file creator further to form a file associated with the encoded multimedia data, the formed file comprising the sub-sample metadata, the parameter set metadata, and the switch sample metadata, wherein when the formed file is received by a decoding system, the switch sample metadata instructs the decoding system on finding a replacement for a specific sample.

21. An apparatus for creating metadata for multimedia data, the apparatus comprising:
  a memory to store the multimedia data;
  a processor coupled to the memory;
  a file creator to receive a file with encoded multimedia data, examine the encoded multimedia data to identify switch sample sets associated with the encoded multimedia data, and to identify samples in the switch sample sets that have identical decoded values while using reference samples from different tracks; and
  a metadata generator to create sub-sample metadata defining a plurality of sub-samples within each sample of multimedia data, and to create switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences, and the file creator further to form a file associated with the encoded multimedia data, the formed file comprising the sub-sample metadata and the switch sample metadata, wherein when the formed file is received by a decoding system, the switch sample metadata instructs the decoding system on finding a replacement for a specific sample.

22. An apparatus for creating metadata for multimedia data, the apparatus comprising:

means for receiving a file with encoded multimedia data, examining the encoded multimedia data to identify switch sample sets associated with the encoded multimedia data, and to identify samples in the switch sample sets that have identical decoded values while using reference samples from different tracks; and a memory to store instructions;

a processor to execute the instructions for performing steps;

creating switch sample metadata defining a plurality of switch sample sets, each switch sample set of the plurality of switch sample sets containing an identified sample, wherein the creating switch sample metadata comprises organizing the switch sample metadata into a predefined data structure and converting each repeated sequence of data within the predefined data structure into a reference to a sequence occurrence and a number of occurrences, and forming a file associated with the encoded multimedia data, the formed file comprising the switch sample metadata, wherein when the formed file is received by a decoding system, the switch sample metadata instructs the decoding system on finding a replacement for a specific sample.

23. An apparatus for creating metadata for multimedia data, the apparatus comprising:

means for creating sub-sample metadata defining a plurality of sub-samples within each sample of the multimedia data;

means for creating parameter set metadata identifying one or more parameter sets for a plurality of portions of the multimedia data;

a memory to store instructions;

a processor to execute the instructions for performing steps;

forming a file associated with the multimedia data, the forming is to receive a file with encoded multimedia data, examine the multimedia data to identify switch sample sets associated with the multimedia data, and to identify samples in the switch sample sets that have identical decoded values while using reference samples from different tracks; and creating switch sample metadata defining a plurality of switch sample sets, each switch sample set of the plurality of switch sample sets containing an identified sample, wherein the creating switch sample metadata comprises organizing the switch sample metadata into a predefined data structure, and converting each repeated sequence of data within the predefined data structure into a reference to a sequence occurrence and a number of occurrences, wherein the formed file comprises the sub-sample metadata, the parameter set metadata, and the switch sample metadata, and wherein when the formed file is received by a decoding system, the switch sample metadata instructs the decoding system on finding a replacement for a specific sample.

24. An apparatus for creating metadata for multimedia data, the apparatus comprising:

means for creating sub-sample metadata defining a plurality of sub-samples within each sample of the multimedia data;

a memory to store instructions;

a processor to execute the instructions for performing steps:

forming a file associated with multimedia data, wherein the forming is to receive a file with encoded multimedia data, examine the multimedia data to identify switch sample sets associated with the multimedia data, and to identify samples in the switch sample sets that have identical decoded values while using reference samples from different tracks; and creating switch sample metadata defining a plurality of switch sample sets, each switch sample set of the plurality of switch sample sets containing sample, wherein the creating switch sample metadata comprises organizing the switch sample metadata into a predefined data structure and converting each repeated sequence of data within the predefined data structure into a reference to a sequence occurrence and a number of occurrences, wherein the formed file comprises the sub-sample metadata and the switch sample metadata, and wherein when the formed file is received by a decoding system, the switch sample metadata instructs the decoding system on finding a replacement for a specific sample.

* * * * *